US009413571B2

(12) United States Patent
Jin et al.

(10) Patent No.: US 9,413,571 B2
(45) Date of Patent: Aug. 9, 2016

(54) SYSTEM AND METHOD FOR TIME REVERSAL DATA COMMUNICATIONS ON PIPES USING GUIDED ELASTIC WAVES

(71) Applicants: University of Maryland Eastern Shore, Princess Anne, MD (US); Carnegie Mellon University, Pittsburgh, PA (US)

(72) Inventors: Yuanwei Jin, Salisbury, MD (US); Deshuang Zhao, Chengdu (CN); Yujie Ying, Pittsburgh, PA (US)

(73) Assignees: University of Maryland, College Point, MD (US); University of Maryland Eastern Shore, Princess Anne, MD (US); Carnegie Mellon University, Pittsburgh, PA (US)

( * ) Notice: Subject to any disclaimer, the term of this patent is extended or adjusted under 35 U.S.C. 154(b) by 112 days.

(21) Appl. No.: 13/787,079

(22) Filed: Mar. 6, 2013

(65) Prior Publication Data

US 2013/0279561 A1    Oct. 24, 2013

Related U.S. Application Data

(60) Provisional application No. 61/607,247, filed on Mar. 6, 2012.

(51) Int. Cl.
*H04L 25/49*    (2006.01)

(52) U.S. Cl.
CPC .................. *H04L 25/4902* (2013.01)

(58) Field of Classification Search
CPC ............. H04L 25/0212; H04L 25/03343; H04L 25/03834; H04L 25/4902; H04L 25/0228; G06F 1/022; H03K 5/01; G01V 1/28; G01V 2210/67; G01V 2210/675; G01V 2210/679

See application file for complete search history.

(56) References Cited

U.S. PATENT DOCUMENTS 5,852,630 A *  12/1998  Langberg et al. ............. 375/219
7,590,510 B2 *  9/2009  Kim ........................ G01H 9/004
                                               340/870.15

(Continued)

OTHER PUBLICATIONS

Wei Wu; Performance of UWB PPM-TH system awith Time Reversal and its improved solution one-bit TR; IEEE, Dec. 2010; 4 pages.*

(Continued)

*Primary Examiner* — Hirdepal Singh
(74) *Attorney, Agent, or Firm* — Carter, DeLuca, Farrell & Schmidt, LLP

(57) ABSTRACT

Embedded piezoelectric sensors in large civil structures for structural health monitoring applications require data communication capabilities to effectively transmit information regarding the structure's integrity between sensor nodes and to the central processing unit. Conventional communication modalities include electromagnetic waves or acoustical waves. While guided elastic waves can propagate over long distances on solid structures, their multi-modal and dispersive characteristics make it difficult to interpret the channel responses and to transfer useful information along pipes. Time reversal is an adaptive transmission method that can improve the spatiotemporal wave focusing. The present disclosure presents the basic principles of a time reversal based pulse position modulation (TR-PPM) method and demonstrates TR-PPM data communication by simulation. The present disclosure also experimentally demonstrates data communication with TR-PPM on pipes. Simulated and experimental results demonstrate that TR-PPM for data communications can be achieved successfully using guided elastic waves.

33 Claims, 24 Drawing Sheets

(56) References Cited

U.S. PATENT DOCUMENTS

| | | | | |
|---|---|---|---|---|
| 2003/0138053 | A1* | 7/2003 | Candy et al. | 375/259 |
| 2004/0131109 | A1* | 7/2004 | Kim et al. | 375/148 |
| 2009/0301198 | A1* | 12/2009 | Sohn et al. | 73/598 |
| 2012/0263056 | A1* | 10/2012 | Smith et al. | 370/252 |
| 2013/0116926 | A1* | 5/2013 | Rodney | G01V 1/42 702/8 |
| 2014/0126567 | A1* | 5/2014 | Husain | H04B 7/024 370/350 |
| 2015/0236848 | A1* | 8/2015 | Ma | H04L 7/042 370/328 |

OTHER PUBLICATIONS

Mijarez et al., "An Automatic Guided Wave Pulse Position Modulation System Using Steel Pipes . . .", 17th World Conf on Nondestructive Testing, Oct. 25-28, 2008, Shanghai, China.
Park et al. Understanding a time reversal process in Lamb wave propagation. Wave Motion 2009, 46, 451-467.
Xu et al., Single mode tuning effects on Lamb wave time reversal with piezoelectric wafer active sensors for structural health monitoring. J. Nondestruct. Eval. 2007, 26, 123-134.
Fink, "Time Reversed Acoustics," Physics Today 50, 34-40 (1997).
Moura et al., "Detection by time reversal: single antenna," IEEE Transactions on Signal Processing 55, 187-201 (2007).
Gutierrez-Estevez et al., "Acoustic channel model for adaptive downhole communication over deep drill strings," in International Conferences on Acoustics, Speech and Signal Processing (ICASSP), IEEE, 2013, pp. 4883-4887.
Kyristi et al., "MISO time reversal and delay spread compression for FWA channels at 5 GHz," IEEE Antennas and Wireless Propagation Letters 3, 96-99 (2004).
Emami et al., "Matched filtering with rate back-off for low complexity communications in very large delay spread channels," in Proc. of the 38th Asilomar Conference on Signals, Systems, and Computers, IEEE, 2004, pp. 218-222.
Yang et al., "Near-optimal waveform design for sum rate optimization in time-reversal multiuser downlink systems," IEEE Transactions on Wireless Communications 12, 346-357 (2013).
Jin et al., Time Reversal Data Communications on Pipes Using Guided Elastic Waves—Part I: Basic Principles. In Proceedings of the SPIE Smart Structures/NDE Conference, San Diego, CA, USA, 2011; vol. 7984, pp. 79840B:1-79840B:12.
Jin et al., Time Reversal Data Communications on Pipes Using Guided Elastic Waves—Part II: Experimental Studies. In Proceedings of the SPIE Smart Structures/NDE Conference, San Diego, CA, USA, 2011; vol. 7984, pp. 79840C:1-79840C:12.
Jin et al., ."Data communications using guided elastic waves by time reversal pulse position modulation: Experimental study," Sensors 13,8352-8376 (2013). Published in 2013.
Jin et al., "Time reversal enabled elastic wave data communications using sensor arrays," 166th Meeting of the Acoustical Society of America, San Francisco, California, Dec. 2-6, 2013. Published on Jan. 29, 2014. Proceedings on Meetings of Acoustics, vol. 20, pp. 045001.
Glaser et al., "Sensor technology innovation for the advancement of structural health monitoring: a strategic program of US-China research for the next decade," Smart Structures and Systems 3(2), 221-244 (2007).
Lynch, "An overview of wireless structural health monitoring for civil structures," Philosophical Transactions of the Royal Society of London. Series A, Mathematical and Physical Sciences 365(1851), 345-372 (2007). The Royal Society, London.
Zimmerman et al., "A parallel simulated annealing architecture for model updating in wireless sensor networks," IEEE Sensors Journal 9, 1503-1510 (Nov. 2009).
Jin et al., "Cognitive sensor network for structure defect monitoring and classification using guided wave signals," in [SPIE Conference on Smart Structures/NDT], 7647, 76473T-1-12, SPIE, San Diego, CA (2010).

Harley et al., "Focusing of ultrasonic waves in cylindrical shells using time-reversal," in [7th International Workshop on Structural Health Monitoring], (2009).
O'Donoughue et al., "Single antenna time reversal of guided waves in pipelines," Proceedings of Meetings on Acoustics 6, 065001-065001-11 (Jun. 2009).
O'Donoughue et al., "Detection of structural defects in pipes using time reversal of guided waves," in [43rd Asilomar Conference on Signals, Systems and Computers], (2009).
Ying et al., "Time reversal detection in pipes," in [SPIE Conference on Smart Structures/NDT], 7647, 76473S-1-12, SPIE, San Diego, CA (2010).
Erickson et al., "Pipelines as communication network links," tech. rep., University of Missouri-Rolla (2005).
Kokossalakis, G., Acoustic Data Communication System for In-pipe wireless sensor network, PhD thesis, Massachusetts Institute of Technology, Cambridge, MA (2006). [Available online at http://dspace.mit.edu/handle/1721.1/34379].
Toda et al., "A lamb wave device for a communication system with ternary logic," Proceedings of the IEEE 68, 297-299 (Feb. 1980).
Sinanovic et al., "Data communication along the drill string using acoustic waves," in [International Conference on Acoustics, Speech, and Signal Processing], 4, 909-912, IEEE (2004).
Wang et al., "A synthetic time-reversal imaging method for structural health monitoring," Smart Materials and Structures 13(1), 415-423 (2004).
Xu et al., "Single mode tuning effects on Lamb wave time reversal with piezoelectric wafer active sensors for structural health monitoring," Journal of Nondestructive Evaluation 26, 123-134 (Dec. 2007).
Jin et al., "Time reversal detection using antenna arrays," IEEE Transactions on Signal Processing 57, 1396-1414 (Apr. 2009).
Gazis, "Three-dimensional investigation of the propagation of waves in hollow circular cylinders. I. Analytical foundation," Journal of Acoustical Society of America 31, 568-573 (May 1959).
Gazis, "Three-dimensional investigation of the propagation of waves in hollow circular cylinders. II. Numerical results," Journal of Acoustical Society of America 31, 573-578 (May 1959).
Li et al., "Excitation and propagation of non-axisymmetric guided waves in a hollow cylinder," Journal of Acoustical Society of America 109, 457-464 (Feb. 2001).
Alleyne et al., "The reflection of guided waves from circumferential notches in pipes," Journal of Applied Mechanics 65, 635-641 (Sep. 1998).
Demma et al., "The reflection of the fundamental torsional mode from cracks and notches in pipes," Journal of Acoustical Society of America 114, 611-625 (Aug. 2003).
Hayashi et al., "Defect imaging with guided waves in a pipe," Journal of Acoustical Society of America 117, 2134-2140 (Apr. 2005).
Wilcox et al., "Mode and transducer selection for long range Lamb wave inspection," Journal of Intelligent Material System and Structure 12(8), 553-565 (2001).
Ditrai, "Utilization of guided elastic waves for the characterization of circumferential cracks in hollow cylinders," J. Acoust. Soc. Am. 96(6), 3769-3775 (1994).
Cawley, "Practical long range guided wave inspection—managing complexity," Rev. Prog. Quant. NDE 657, 22-40 (2003).
Seco et al., "Pcdisp: A tool for the simulation of wave propagation in cylindrical waveguides," in [9th International Congress on Sound and Vibration], (2002).
Yang, "Timing PPM-UWB signals in ad hoc multi-access," IEEE Journal on Selected Areas in Communications 4, 794-800 (Apr. 2006).
Win et al., "Ultra-wide bandwidth time-hopping spread-spectrum impulse radio for wireless multiple-access communications," IEEE Trans. Communications 48(4), 679-689 (2000).
Jin et al., "Time reversal in multiple-input multiple-output radar," IEEE Journal of Selected Topics in Signal Processing 4, 210-225 (Feb. 2010).
Jin et al., "Multiple antenna time reversal transmission in ultra-wideband communications," in [IEEE Globe Communication Conference], 3029-3033, IEEE,Washington DC (2007).

(56) References Cited

OTHER PUBLICATIONS

Michaels et al., Detection of structural damage from the local temporal coherence of diffuse ultrasonic signals. IEEE Trans. Ultrason. Ferroelectr. Freq. Control 2005, 52, 1769-1782.

Sohn et al., Development of dual PZT transducers for reference-free crack detection in thin plate structures. IEEE Trans. Ultrason. Ferroelectr. Freq. Control 2010, 57, 229-240.

Edelmann et al., Underwater acoustic communications using time reversal. IEEE J. Oceanic Eng. 2005, 30, 852-864.

Nguyen et al., Time reversal in wireless communications: A measurement-based investigation. IEEE Trans. Wirel. Commun. 2006, 5, 2242-2252.

Lerosey et al., Time reversal of electromagnetic waves. Phys. Rev. Lett. 2004, 92, 194301.

Guo et al., Reduced complexity UWB time reversal techniques and experimental results. IEEE Trans. Wirel. Commun. 2007, 6, 4221-4226.

Tian et al., Low-complexity ML timing acquisition for UWB communications in dense multipath channels. IEEE Trans. Wirel. Commun. 2005, 4, 3031-3038.

Aedudodla et al., Timing acquisition in ultra-wideband communication systems. IEEE Trans. Veh. Technol. 2005, 54, 1570-1583.

Renzo et al., A novel class of algorithms for timing acquisition of differential transmitted reference UWB receivers: Architecture, performance analysis and system design. IEEE Trans. Wirel. Commun. 2008, 7, 2368-2387.

Yang et al., Timing UWB signals using dirty templates. IEEE Trans. Commun. 2005, 53, 1952-1963.

Mijarez et al., An Automatic Guided Wave Pulse Position Modulation System Using Steel Pipes as a Communication Channel for Flood Detection in Steel Offshore Oilrigs. In Proceedings of the 17th World Conference on Non-Destructive Testing, Shanghai, China, Oct. 25-28, 2008; pp. 1-6.

Mijarez et al., Automatic guided wave PPM communication system for potential SHM of flooding members in sub-sea oilrigs. Smart Mater. Struct. 2013, 22, 055031:1-055031:9.

Sinanovic et al., Data Communication along the Drill String Using Acoustic Waves. In Proceedings of the International Conference on Acoustics, Speech, and Signal Processing, Montreal, QC, Canada, May 17-21, 2004; vol. 4, pp. 909-912.

Lin et al., Diagnostic lamb waves in an integrated piezoelectric sensor/actuator plate: Analytical and experimental studies. Smart Mater. Struct. 2001, 10, 907-913.

Lin et al., Modeling and testing of PZT and PVDF piezoelectric wafer active sensors. Smart Mater. Struct. 2006, 15, 1085-1093.

Fink, Time reversal of ultrasonic fields. Part I: Basic principles. IEEE Trans. Ultrason. Ferroelectr. Freq. Control 1992, 39, 555-566.

Ing et al., Time-reversed Lamb waves. IEEE Trans. Ultrason. Ferroelectr. Freq. Control 1998, 45, 1032-1043.

\* cited by examiner

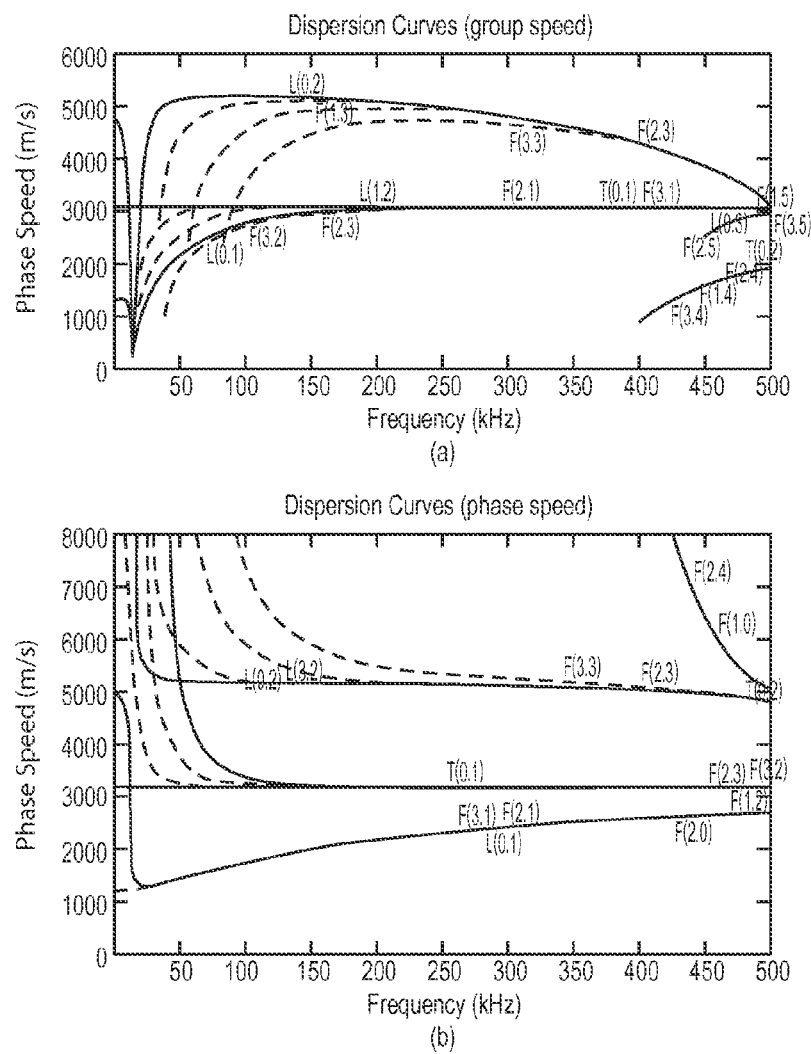
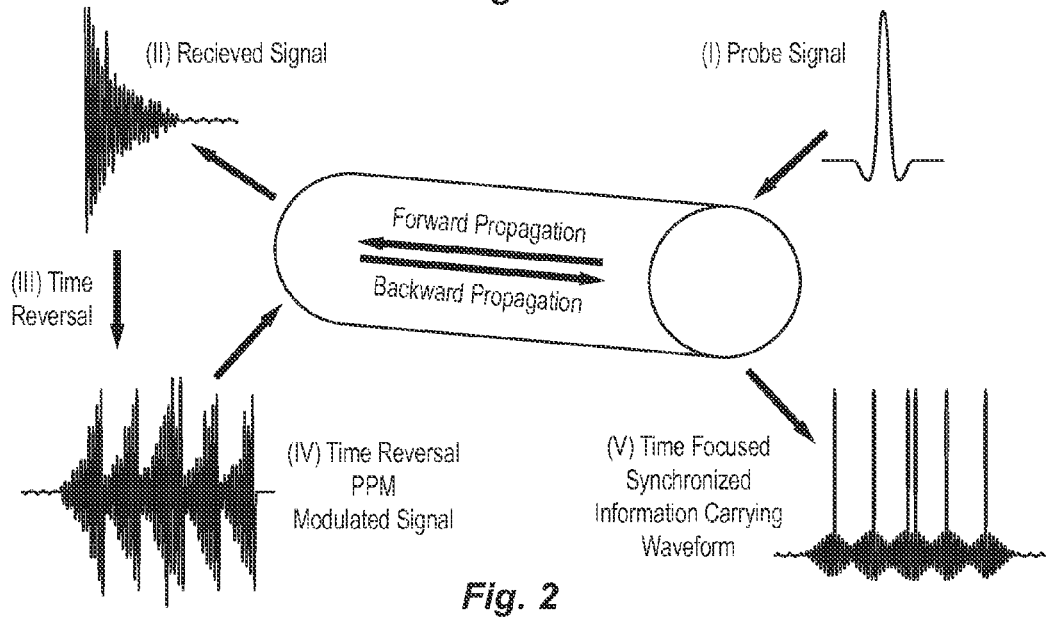
Fig. 1
Fig. 2

Specifications of the Experimental Specimens
| Pipe | Test Scenario | Specifications | | | | | Transducer | |
|---|---|---|---|---|---|---|---|---|
| | | Length (mm) | OD (mm) | WT (mm) | Pressure (PSI) | Weld | Size (mm x mm) | TD (mm) |
| I | 1 | 1833 | 70 | 4 | 0 | None | 20 x 8 | 1200 |
| | 2 | 1833 | 70 | 4 | 50 | None | 20 x 8 | 1200 |
| | 3 | 1833 | 70 | 4 | 100 | None | 20 x 8 | 1200 |
| II | 4 | 1833 | 70 | 4 | 0 | Welded Butt Joint | 20 x 8 | 1200 |
*Fig. 6*
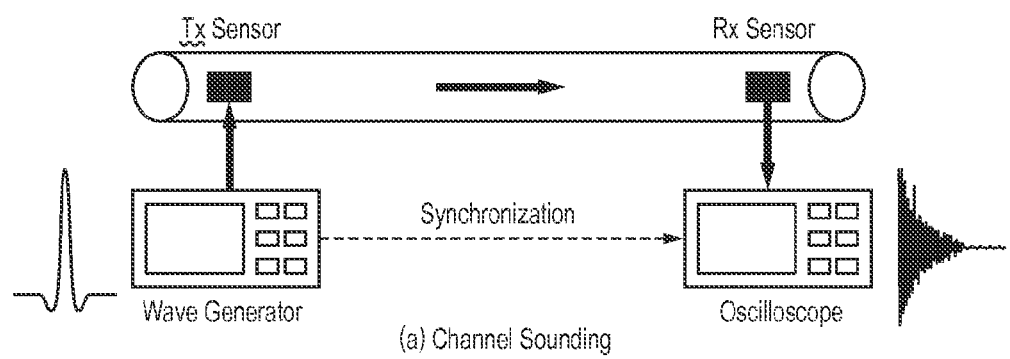
(a) Channel Sounding
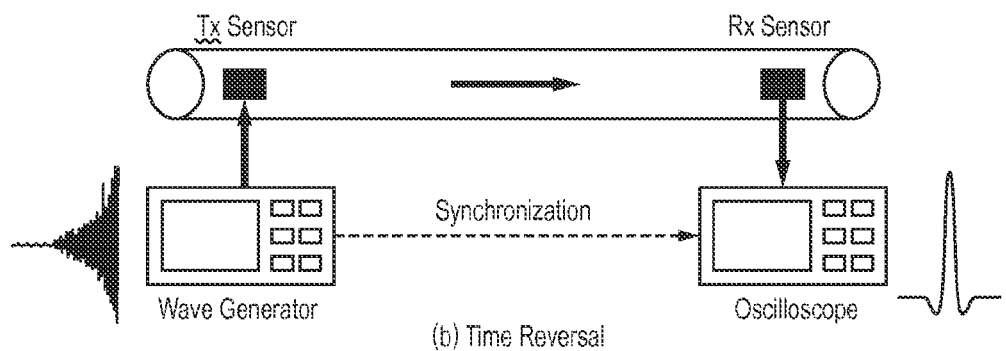
(b) Time Reversal
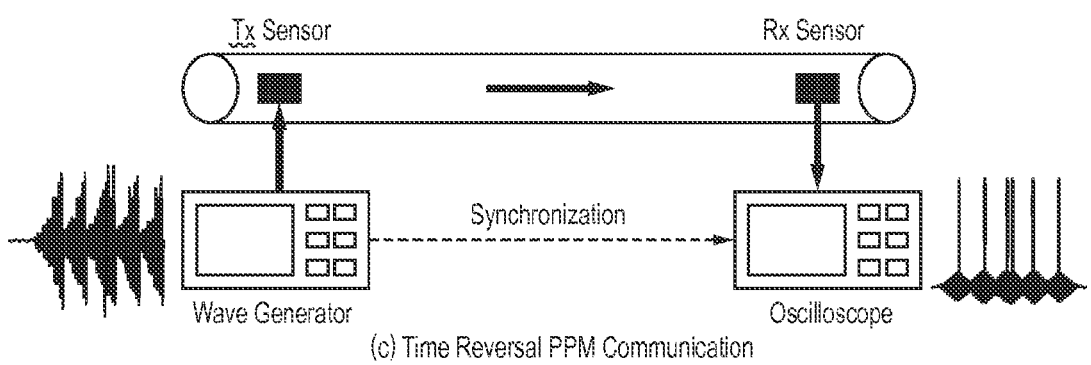
(c) Time Reversal PPM Communication
*Fig. 7*

SYSTEM AND METHOD FOR TIME REVERSAL DATA COMMUNICATIONS ON PIPES USING GUIDED ELASTIC WAVES

PRIORITY CLAIM

The present application claims priority to and the benefit of the previously filed provisional application assigned U.S. Provisional Patent Application No. 61/607,247, entitled "Time Reversal Data Communications on Pipes Using Guided Elastic Waves," filed on Mar. 6, 2012, the entire contents of the provisional patent application are incorporated herein by reference.

RELATED TO

The present application is related to two publications: (1) Y. Jin, D. Zhao, and Y. Ying, "Time Reversal Data Communications on Pipes Using Guided Elastic Waves—Part I: Basic Principles," Proceedings of the SPIE Smart Structures & Non-Destructive Evaluation, San Diego, Mar. 6-10, 2011. Proc. SPIE 7984, pp. 79840B (1-12); and (2) Y. Jin, Y. Ying, and D. Zhao, "Time Reversal Data Communications Using Guided Elastic Waves—Part II: Experimental Studies," Proceedings of the SPIE Smart Structures & Non-Destructive Evaluation, San Diego, Mar. 6-10, 2011. Proc. SPIE vol. 7984, pp. 79840C (1-11). The entire contents of the two publications are incorporated herein by reference.

BACKGROUND

1. Technical Field

The present disclosure, inter alia, relates to the use of steel pipes as communication medium for data transmission and reception.

2. Description of Related Art

Piezoelectric sensors have long been used for inspecting the integrity of large civil structures such as pipes, offshore platforms, bridges, railways, etc. Upon excitation, active acoustic sensor, or actuators, can generate elastic waves that propagate a long distance, interrogate structures for possible defects, thus providing information of the operating conditions of the structure. With the advancement of sensor technology and emerging signal and data processing techniques, much effort has been devoted to the development of integrated monitoring systems for large civil structures. Structural health monitoring (SHM) is a systematic methodology for continuously assessing the integrity of a structure for the identification of damage. SHM is increasingly being deployed to monitor and predict vulnerabilities in large civil infrastructures to prevent critical failure.

In the classic communication theory, information bearing signals are modulated and excited from a transmitter; the excitation signals propagate through physical medium, such as air, water, or cable, and are received by a receiver. The received signals are demodulated. The transmitted information is then recovered. For example, in wireless communication systems, electromagnetic signals are used as carriers for data transmission. The transmission medium is air. In underwater acoustic communication, acoustical signals are utilized for transmitting information. The transmission medium is water. In many existing SHM sensor network applications, conventional schemes such as wireless radio communication and acoustical communication are adopted and modified for data communication.

However, research has shown that in many real-life applications, conventional communication schemes are inapplicable or undesirable. For example, for pipes that are buried underground or for hollow sub-sea structures in offshore platforms, radio communication is difficult to realize because electromagnetic wave signals suffer severe decay in soil or water which results in very short transmission range.

Therefore, there is a need to address these shortcoming and disadvantages of conventional communication schemes for structural health monitoring applications.

SUMMARY

Piezoelectric sensors that are embedded in large structures and are inter-connected as a sensor network can provide critical information regarding the integrity of the structures being monitored. A viable data communication scheme for sensor networks is needed to ensure effective transmission of messages regarding the structural health conditions from sensor nodes to the central processing unit (or other type of processing unit, such as a controller) and between sensor nodes.

The present disclosure describes a time reversal based data communication scheme or method that utilizes a sensor network and guided elastic waves for structural health monitoring applications. Unlike conventional data communication technologies that use electromagnetic radio waves or acoustical sound waves, the method according to the present disclosure utilizes elastic waves as message carriers and steel pipes (or other structures such as metallic bars, plates, etc.) as transmission channels. Using elastic wave for data communications can potentially enable effective inter-sensor communication under conditions where conventional methods are too costly (e.g., optical communication) or not reliable (e.g., the quality of a radio communication link under dispersive medium degrades very quickly). In spite of the advantages of guided elastic wave that can propagate on pipes for a great distance, however, the multi-modal and dispersive characteristics of guided waves make it difficult to interpret the channel responses or to transfer correctly the structural information data along pipes. The time reversal based pulse position modulation (PPM) method can successfully take advantage of the multipath and multimodal dispersion, focus signal energy over dispersive channel, thus resulting in clean signals for demodulation.

In communication systems, demodulation is a process of extracting original information bearing signals from a modulated carrier signal (e.g., signals that are modulated by the pulse position modulation method). Timing acquisition or synchronization is one of the most critical steps of demodulation in communication system design, i.e., the receiver must know the exact starting time in order to correctly demodulate the transmitted symbols from often distorted received signals due to channel dispersion. A key disadvantage of pulse position modulation (PPM) is that PPM is sensitive to multipath interference caused by channel dispersion, and thus often requiring complicated timing estimation algorithms and costly hardware to determine the best timing. The time reversal PPM method according to the present disclosure is a low complexity rapid timing acquisition scheme in that the dispersive channel is implicitly pre-equalized due to the reciprocity property of the elastic wave propagation channels, thus eliminating the requirements for complicated channel estimation algorithms or circuits at the transmitter or the receiver. Using a small number of training preamble symbols, the starting time of symbol frames can be estimated very quickly and accurately, which enables high data rate communications even in the presence of severe dispersion in elastic wave channels.

According to one aspect of the present disclosure, there is disclosed a data communications method. The method includes the steps of time reversing a signal; modulating the time reversed signal using pulse position modulation to generate a time reversed pulse position modulated signal; and using the time reversed pulse position modulated signal for data transmission. The signal that is time reversed is a pilot signal transmitted via a transmission channel. The data is transmitted using guided elastic waves via the transmission channel which is a civil structure, such as a pipe, bridge, railway, pipe-like hollow structure, offshore platform, etc. The method further includes providing a sensor network having a plurality of sensors, and a controller; each of the plurality of sensors is mounted on the civil structure. The data communications are between the plurality of sensors of the sensor network, and between the sensor network and a controller. The method includes compensating for transmission channel dispersion by transmitting data via the transmission channel using the time reversed pulse position modulated signal. The data includes data relating to a structural condition of the transmission channel. The method further includes compensating for signal dispersion by transmitting data via the transmission channel using the time reversed pulse position modulated signal. The method further includes using the time reversed pulse position modulated signal for timing acquisition.

According to another aspect of the present disclosure, there is disclosed a timing acquisition and synchronization method for demodulation. The method includes the steps of time reversing a signal; modulating the time reversed signal using pulse position modulation to generate a time reversed pulse position modulated signal; and using the time reversed pulse position modulated signal for transmission of data symbols for timing acquisition and synchronization. The signal that is time reversed is a pilot signal transmitted via a transmission channel. The data is transmitted using guided elastic waves via a transmission channel. The transmission channel can be a civil structure, such as a pipe, bridge, railway, pipe-like hollow structure, offshore platform, etc. The method further includes providing a sensor network having a plurality of sensors, and a controller; each of the plurality of sensors is mounted on the civil structure. The transmission of data symbols is between the plurality of sensors of the sensor network, and between the sensor network and a controller. The method includes compensating for transmission channel dispersion by transmitting data symbols via the transmission channel using the time reversed pulse position modulated signal. The data symbols relate to a structural condition of the transmission channel. The method further includes compensating for signal dispersion by transmitting data symbols via the transmission channel using the time reversed pulse position modulated signal.

According to another aspect of the present disclosure, there is disclosed a system for transmitting data communications. The system includes a transmission channel; a sensor network having a plurality of sensors mounted to the transmission channel; and at least one controller in operative communication with the sensor network. The at least one signal is transmitted via the transmission channel carrying data, and wherein the at least one signal is a time reversed pulse position modulated signal. The transmission channel is a civil structure, such as a pipe, bridge, railway, pipe-like hollow structure, offshore platform, etc. The at least one signal is transmitted between the plurality of sensors of the sensor network, and between the sensor network and the at least one controller. The data includes data relating to a structural condition of the transmission channel.

Another aspect of the present disclosure is a non-transitory computer readable storage medium storing a program which, when executed by a computer, causes the computer to perform a method for transmitting data. The method includes time reversing a signal; modulating the time reversed signal using pulse position modulation to generate a time reversed pulse position modulated signal; and using the time reversed pulse position modulated signal for data transmission. The data is transmitted via a civil structure and can be binary data. The civil structure can be a pipe, bridge, railway, pipe-like hollow structure, offshore platform, etc. The data includes data relating to a structural condition of a transmission channel. The time reversed pulse position modulated signal can take the form of $$s(t) = \sum_{i=0}^{M-1} ky(-t)\delta(t - iT_f - c_j\Delta)$$

BRIEF DESCRIPTION OF THE DRAWINGS

Various preferred embodiments of the present disclosure are described herein with reference to the drawings, wherein:

FIG. 1 is a graphic representation of the dispersion curve for the longitudinal, torsional and flexural modes of guided elastic waves transmitted across a 4 mm thick steel pipe. (a) The plot depicts the dispersion curve according to group speed versus frequencies; and (b) The plot depicts the dispersion curve according to phase speed versus frequencies. $L(0, n)$ is the longitudinal mode, $T(0, n)$ is the torsional mode, and $F(m, n)$ is the flexural mode.

FIG. 2 is an illustration of time reversal pulse position modulation (TR-PPM) enabled data communication over steel pipes according to the present disclosure. (i) The plot represents a pilot signal is sent through the pipe for probing the dispersive channel; (ii) The plot represents the received pilot signal, which is time spread; (iii) The plot represents the received signal time-reversed in the time domain; (iv) The plot represents TR-PPM applied to the received signal for information bit transmission; and (v) The plot represents the synchronized received signal detected and demodulated for information retrieval.

FIG. 6 is a table of the specifications of the two steel pipe specimens used in the data communication experiments according to the present disclosure.

FIG. 7 depicts the time reversal PPM communication protocol according to the present disclosure that includes steps for (a) channel sounding; (b) time reversal; and (c) time reversal PPM timing acquisition and demodulation.

FIG. 7 Item (a) Channel Sounding; FIG. 15; and FIG. 20.

FIG. 7 Item (c) Time Reversal PPM Communication; FIG. 15; and FIG. 20.

DETAILED DESCRIPTION

Figure 3:
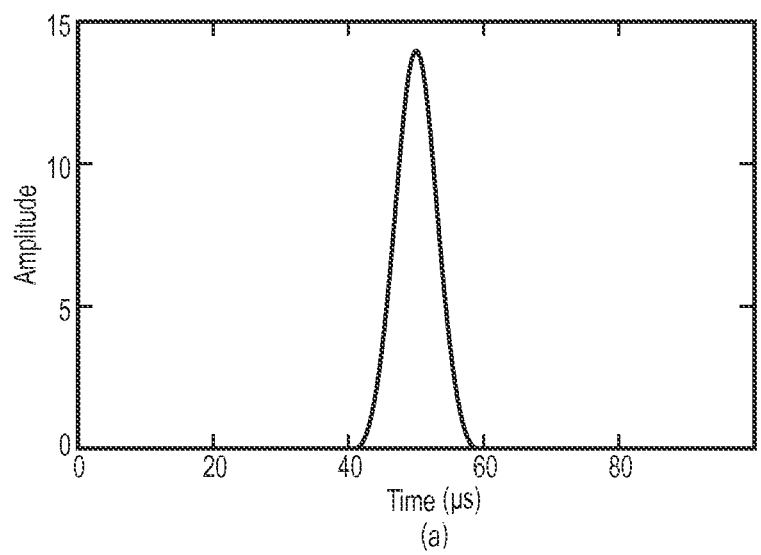
FIG. 3 is an illustration of a (a) transmitted Gaussian pilot signal p(t); and (b) simulated channel impulse response function h(t).
Figure 3:
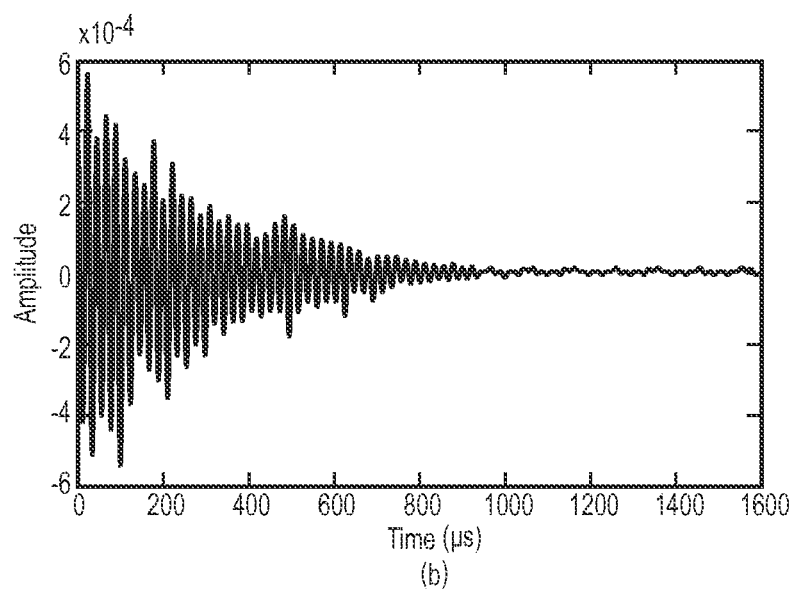

In the Summary and Brief Description of the Drawings sections above, in this Detailed Description, in the Claims below, and in the accompanying drawings, reference is made to particular features (including method steps or acts) of the present disclosure. It is to be understood that the disclosure in this specification includes combinations of parts, features, or aspects disclosed herein. For example, where a particular feature is disclosed in the context of a particular aspect or embodiment of the present disclosure, or a particular claim, that feature can also be used, to the extent possible, in combination with and/or in the context of other particular aspects and embodiments of the present disclosure, and in the disclosure generally.

The term "comprises" and grammatical equivalents thereof are used herein to mean that other components, ingredients, steps, acts, etc. are optionally present. For example, an article "comprising (or "which comprises") component A, B, and C can consist of (i.e., contain only) components A, B, and C, or can contain not only components, A, B, and C but also one or more additional components, elements, features, ingredients, steps, acts, etc.

Where reference is made herein to a method comprising two or more defined steps or acts, the defined steps or acts can be carried out in any order or simultaneously (except where the context excludes that possibility); and the method can include one or more other steps or acts which are carried out before any of the defined steps or acts, between two of the defined steps or acts, or after all the defined steps or acts (except where the context excludes that possibility).

The term "at least" means one or more than one. When, in this specification, a range is given as "(a first number) to (a second number)" or "(a first number) (a second number)," this means a range whose lower limit is the first number and whose upper limit is the second number. For example, 25 mm to 100 mm means a range whose lower limit is 25 mm, and whose upper limit is 100 mm.

The method according to the present disclosure is presented in four parts: In Part I, we present the basic principles of the time reversal based pulse position modulation and demonstrate by simulation that this method can effectively overcome transmission channel dispersion, achieve timing acquisition and synchronization, and deliver information bits through steel pipes or pipe-like structures correctly despite severe channel dispersion for elastic waves. In Part II, we perform a series of time reversal data communication experiment by sending the modulated time reversal signals as a stream of binary bits at a given data rate on carbon steel and stainless steel pipe specimens. Even though carbon steel and stainless steel pipes were used in the experiments described herein, the systems and methods according to the present disclosure can be used in pipes manufactured from other types of materials. Experimental results demonstrate that time reversal pulse position modulation for data communications can be achieved successfully using guided elastic waves. In Part III, we perform experimental tests on steel pipe specimens using PZT transducer arrays to further improve the communication performance. Furthermore, we conduct field tests in a real-world environment to verify and to demonstrate the robustness of our proposed time reversal based data communication schemes using elastic waves. In Part IV, we provide additional test results on a carbon steel pipe specimen and a stainless steel pipe specimen for the time reversal pulse position modulation scheme. We send a relatively longer stream of bits compared with the tests conducted in Part II at different data rates. The results demonstrate the feasibility of (real-time) automatic decoding of the long bit streams on pipes using elastic waves.

PART I

Basic Principles

1. Introduction

Unlike conventional nondestructive techniques, according to the present disclosure, a structural health monitoring (SHM) system would utilize permanently mounted or embedded sensors on the structure, such as a steel pipe, to provide continuous assessment of structural integrity. The sensors in a SHM system will inter-connect and become an integrated network for defect monitoring and assessment to ensure the normal operation of the structure. Various studies have been conducted that use sensor networks for monitoring and detecting of defects or damage in civil structures.

One of the SHM applications using piezoelectric sensor networks, according to the present disclosure, is the monitoring of structural integrity for pipelines or pipe-like hollow structures in offshore platforms. Early research demonstrates that a network of piezoelectric sensors that are mounted on steel pipes provides improved performance in terms of detection and classification compared with conventional inspection methods. One of the important aspects of sensor networks for SHM applications is its ability of data communication between sensors. This is because the operating status and conditions of the structure must be sent through the network to a center processing unit so that human operators can take necessary actions. Data communication within a sensor network could occur between two or multiple sensor nodes or between sensor nodes and at least one central processing unit (or other type of processing unit, such as, a microprocessor, controller, etc. (collectively referred to herein and in the claims as a "controller")).

In this part, i.e., Part I, a time reversal based guided elastic wave communication scheme is developed that utilizes steel pipes as transmission channels in accordance with the present disclosure. The contribution of the present disclosure lies in the following two perspectives: First, the use of steel pipes as communication medium for data transmission and reception. Unlike the conventional transmission modalities, modulated guided elastic signals that can propagate on steel pipes will be transmitted and received by piezoelectric sensors mounted on or embedded in steel pipes. Although communication inside a pipe using electromagnetic or acoustics (i.e., treating the pipe as an acoustic waveguide) has been reported, the research of using guided elastic waves for data communication is very limited. Some earlier work that addresses elastic wave communication includes drill string communication in the measurement while drilling (MWD) and logging while drilling (LWD) services in oil and gas industry or developing a Lamb wave device for communication system with ternary logic. Very recently, studies for flood detection using guided acoustic waves in offshore oilrigs have been report. However, the realized data rate was very low because a 2 kHz narrow frequency band (39 kHz-41 kHz) was used in order to reduce channel dispersion. Therefore, there has not been systematic study of high data rate communication schemes using guided elastic waves.

Second, time reversal based pulse position modulation (TR-PPM) method is utilized to compensate for the signal and channel dispersion in the communication system design. Time reversal has emerged as a viable approach for overcoming signal dispersion in many applications such as underwater acoustics, electromagnetics, etc. Time reversal provides a novel mechanism for adaptively transmitting signals that match with the propagation medium in order to enhance signal detection due to the reciprocity property of the transmission channel. Recently, a growing body of research has been devoted to time reversal based waveform transmission for the applications of detection, localization, and classification.

Time reversal is considered as an adaptive waveform transmission scheme that implements iterative probing and learning from the returned sensing signals based on the interaction of the sensor and the environment. From the communication theory perspective, time reversal is an implicit pre-equalization method by utilizing the reciprocity of the transmission channel. Our previous research has shown that time reversal provides significant benefit in signal detection and classification for SHM applications. Here, in Part I, it will be demonstrated that time reversal PPM can effectively overcome dispersion of guided elastic waves, achieve rapid and accurate signal synchronization, and thus enabling high data rate communication through steel pipes.

Part I presents the theoretical aspect of the elastic wave communication scheme or method according to the present disclosure. The experimental results are presented in Part II, Part III and Part IV. The remainder of Part I is organized as follows: Section 2 discusses the characteristics of pipe wave propagation. Section 3 presents the basic principles of TR-PPM data communication using pipe waves. Section 4 presents simulation based results for data communications. Conclusion is drawn in section 5.

2. Characteristics of Pipe Wave Propagation

Guided waves, i.e., waves that travel along a rod, tube, pipe, or plate-like structure, form as a result of the interaction between ultrasonic excitation signals propagating in a medium and the medium's boundaries. Conventionally, we use Lamb waves to refer to the elastic waves that propagate in thin plates. Here we use pipe waves to refer to the guided waves propagating in pipes or thin cylindrical shells. The excitation of guided ultrasonic waves has become a popular tool for the nondestructive inspection of pipes and other physical infrastructures due to their potential to travel great distances.

However, there are three fundamental difficulties when guided waves are utilized for pipe inspection or data communication, i.e., dispersion, multi-mode, and ambient noise. First, the elastic guided wave signals are highly dispersive. Signal dispersion stems from the elastic wave propagation mechanism that signal transmission speed varies with frequencies. Acoustic signal dispersion causes signal time spreading, as well as phase and frequency shift. In the communication theory, this phenomenon is called multipath propagation. The delayed arrivals of propagating signals may overlap destructively causing severe signal attenuation, or signal fading, which results in poor system performance in many stages of the communication flow including synchronization, signal detection, and demodulation, etc.

Second, pipe waves are characterized by an infinite number of dispersive longitudinal and torsional modes and a doubly infinite number of flexural modes. The longitudinal and torsional modes are both axisymmetric while each flexural mode exhibiting an infinite number of non-axisymmetric circumferential mode orders. Thus a proper selection of wave modes for signal transmission would be a critical but difficult task. FIG. 1 depicts the group speed and phase speed versus the frequencies for a steel pipe with inner radius of 31 mm and outside radius of 35 mm in the frequency range of 10 kH to 500 kH. The longitudinal modes, flexural modes, and torsional modes are clearly present. The plots in FIG. 1 are generated using the PCdisp software.

Third, ambient noise exists in the received signals. Ambient noise refers to the addition of a random signal of specific mean value and variance. A high noise level reduces the signal-to-noise power ratio at the receiver, which yields poor performance for signal detection. Adaptive filtering methods should be employed to reduce the level of ambient noise.

3. Basic Principle of Pipe Wave Communication

A complete communication system design is very complicated. In Part I, we focus on a proof-of-concept design which shows that information bits '0's and '1's can be transmitted using pipes waves and be recovered correctly in spite of severe channel dispersion that exists in elastic medium.

3.1 Pulse Position Modulation (PPM)

In this section, we present the data communication scheme based on pulse position modulation (PPM) for pipe waves. The developed communication scheme will overcome channel dispersion and achieve symbol synchronization for signal detection. Pulse-position modulation is a form of signal modulation in which the message information is encoded in the time delay between pulses in a sequence of signal pulses. Time hopping PPM has been widely used in impulse-radio ultra-wideband (UWB) system. For elastic wave communication, we will use wide band pulses for signal modulation in which every transmitted symbol is composed of $N_f$ repeated pulses called a frame. Let $T_s$ and $T_f$ denote the symbol duration and frame duration, respectively, then $$T_S = N_f T_f, \quad (1)$$

which means there is one pulse per frame. A general wideband symbol signature waveform transmitted during the acquisition process for a single user can be expressed as a series of wideband monocycles $$g_s(t) = \sum_{j=0}^{N_f-1} g(t - jT_f - a_j T_c) \quad (2)$$

where $a_j \in [0, N_c-1]$ represents user-specific pseudorandom time hopping (TH) code for separating receive sensors. The hopping pattern may take on different forms, such as fast hopping or slow hopping. Furthermore, the data symbols are modulated during transmission. Each frame contains $N_c$ chips, each of duration $T_c$. The PPM modulated wideband pipe wave signal transmitted by the desired sensor is described as $$s(t) = \sum_i g_s(t - iN_f T_f - c_i \Delta) \quad (3)$$

where $c_i \in \{0, 1\}$ represent the data symbols that are modeled as binary independent and identically distributed (i.i.d.) random variables, and $\Delta$ represents the time shift imposed on all the monocycles of a given block by a unit data symbol. Each excitation pulse $s(t)$ is of ultrashort duration $T_p \ll T_f$ at the microsecond scale, occupying a wide bandwidth. Note that we will choose $N_c=1$ and $N_f=1$ in this Part.

Next, we discuss the propagation channel. For elastic waves, the characteristics of the propagation channel between any two locations are very complicated, in that the response of the channel is governed by the propagation wave equations as well as the boundary conditions. However, for point-to-point data communication on steel pipes, we can model the propagation channel for wideband signal communications as a stochastic tapped delay line, $$h(t) = \sum_{l=0}^{L-1} a_l f_l(t - \tau_l) \quad (4)$$

where L is the number of taps in the channel response, $\alpha_l$ is the path gain at excess delay $\tau_l$ corresponding to the l-th propagation path. The function $f_l(t)$ model the combined effect of the transmit and receive sensors and the propagation channel corresponding to the l-th path of the transmitted pulse. Here we consider h(t) is the superposition of various wave modes within the excitation frequency range. Based on the linear system theory, the received signal from the receiver sensor can then be written as $$r(t) = s(t) * h(t) + w(t) \quad (5)$$

$$= \sum_{i=-\infty}^{\infty} q(t - iN_f T_f - c_i \Delta - r) + w(t) \quad (6)$$

where the symbol * denotes linear convolution, and $$q(t) = \sum_{l=0}^{L-1} \alpha_l \phi_l(t - \tau_l) \quad (7)$$

is the received waveform corresponding to a single pulse. The signal $$\psi_l = f_l(t) * s(t) \quad (8)$$

is the received wideband elastic signal pulse from the l-th path. w(t) is the additive noise with zero-mean and complex Gaussian distribution. The symbol $\tau_0$ is the direct propagation delay between the transmitter and the receiver. One of the challenges in enabling pulsed wideband communication is synchronization, i.e., before the signal can be demodulated, each frame of the received signals needs to be aligned by correlating the received signal with the originally transmitted signal. This process is called timing acquisition or synchronization.

Most existing synchronizers are based on the maximum likelihood principle that requires a "clean template" of the received pulse. However, the latter is not available when the unknown propagation channel is highly dispersive and multipath rich. Other existing schemes are usually very complicated. Thus, in order to realize PPM in highly dispersive elastic wave channel, we need to estimate the timing offset $\tau_0$ accurately. In Part I, we use time reversal method to achieve accurate and rapid timing acquisition or synchronization for demodulation.

3.2 Time Reversal PPM for Data Communication

In this section, we describe the time reversal based PPM scheme for signal synchronization and detection. We consider two sensors that are mounted on a steel pipe with sensor A being the transmitter sensor and sensor B being the receiver sensor. In a conventional data communication configuration, the information will be modulated by waveform s(t) and sent from sensor A to sensor B. The channel impulse response h(t), often called the Green's function, characterizes the structural response of the pipe in the time domain between sensor A and sensor B. FIG. 2 illustrates the time reversal PPM scheme according to the present disclosure, which can be described as follows:

Step-1: Channel Sounding

This step probes the channel h(t) between the sensor A and B. In the time reversal PPM scheme, rather than sending information carrying signal s(t) directly from the source sensor A to the destination sensor B, we will first probe the propagation channel h(t) by sending a pilot signal p(t) from the destination sensor B to the source sensor A. After p(t) propagates through the channel, the received signal a sensor A is expressed by $$y(t)=p(t)*h(t), \quad (9)$$

where the symbol * represents the linear convolution. We choose a modulated Gaussian pulse $$p(t) = Ae^{-\left(\frac{t-t_0}{T}\right)^2}\cos(2\pi f_c t) \quad (10)$$

as the probe signal, where $f_c$ is the center frequency of the modulation signal, T is the pulse width, $t_0$ is the time offset from t=0, and A is the amplitude. The transmission energy for signal p(t) is given by $$E_p = \int_{-\infty}^{\infty}|p(t)|^2 dt \quad (11)$$

Step-2: Time Reversal

In this step, y(t) is recorded and time reversed in the time domain. The time reversing operation is equivalent to reading the data by first-in-last-out. After time reversal, the waveform that will be used for signal modulation and transmission becomes $$\hat{s}(t) \triangleq y(-t) = p(-t) * h(-t) \quad (12)$$

where y(−t) is called the time reversed waveform. The signal ŝ(t) is the information carrier for data transmission.

Step-3: Time Reversal Pulse Position Modulation (TR-PPM)

Next, the signal ŝ(t) in (12) will be modulated using PPM. Notice that the channel impulse response h(t) is also time reversed when y(t) is time reversed. The time reversed channel impulse response, h(−t) plays an important role in the time reversal transmission because it compensates for the time delays that result from different propagating paths and wave modes in the channel. If we retransmit y(−t) back to the channel, by the channel reciprocity property, the retransmitted waveform will focus the scattered multipath energies on the initial source receiver temporally and spatially by time reversal. Thus, the intensity of the signal received by the receiver is increased significantly and the time spread is compressed substantially. The TR-PPM modulated signal takes the form of $$s(t) = \sum_{i=0}^{M-1} ky(-t)\delta(t - iT_f - c_j\Delta) \quad (13)$$

where $c_j \in \{0, 1\}$ is the binary data to be transmitted, $T_f$ is the frame time to send one bit data, $\Delta$ is the additional time shift to distinguish between the pulses carrying the bit "0" or "1." $\delta(\cdot)$ is the Dirac delta function. The energy-normalization coefficient obtained in (13) is given by $$k = \sqrt{\frac{E_p}{E_y}} \quad (14)$$

where $$E_y = \int_{-\infty}^{\infty} y^2(-t)dt \quad (15)$$

3.3 Time Reversal Enabled Timing Acquisition

In time reversal based timing acquisition scheme, the time reversed signal waveform y(−t) in (12) obtained from the channel probe stage will be used first as preambles for timing acquisition, and then as the modulation waveforms for transmitting data package. The total transmitted waveform for timing acquisition and for data transmission is given as follows:

$$s(t) = \begin{cases} \sum_{n=0}^{N-1} ky(-t)\delta(t - nT_f), & 0 \leq t \leq NT_f, \\ & \text{timing acquisition stage} \\ 0, & NT_f < t \leq NT_f + T_g, \\ \sum_{i=0}^{M-1} ky(-t)\delta(t - iT_f - c_j\Delta), & t > NT_f + T_g, \\ & \text{data transmission stage} \end{cases} \quad (16)$$

where $T_f$ is the frame duration for one bit transmission, and $\Delta$ is the shifting time for distinguishing the pulses carrying 0 or 1 bits. N is the total number of the time reversed waveforms used in the preambles for training purposes. The guard time $T_g$ is for preventing the waveform of the useful data from overlapping the tails of the timing preambles. All binary data $c_j \in \{0,1\}$, is modulated by the pulse position modulation (PPM) scheme, and M is the total number of binary bits for each data package that needs to be transmitted.

3.4 Timing Acquisition at Receiver

In our system, the guard time slot $T_g$ is a known parameter to both the transmitter and the receiver. Therefore, the receiver only needs to estimate the starting time of the preambles. After the transmitted signals propagate through the channel, the preambles arriving at the receiver become $$r_{pre}(t) = \sum_{n=0}^{N-1} y(-t - nT_f) * h(t) \quad (17)$$
$$= \sum_{n=0}^{N-1} p(-t + nT_f) * h(-t) * h(t)$$

Hence, the channel is implicitly pre-equalized at the transmitter by time reversal, and most multipath energies automatically focus on the receiver. Therefore, the receiver does not need to estimate the channel and collect the multipath energies using a complicated and costly multi-finger Rake receiver. So the receiver could be designed with low complexity and low cost. Here we employ only one sliding correlation detector combined with a single tap finger to capture and detect the received signals. To recover the starting time from the received preambles, a locally generated template u(t) is applied to matching them in a sliding mode as follows $$R_{pre}(\tau) = \int_0^{NT_f} r_{pre}(t) \cdot u(t - \tau) dt \quad (18)$$

-continued $$= \int_0^{NT_f} \left( \sum_{n=0}^{N-1} p(-t+nT_f) * h(-t) * h(t) \right) \cdot u(t-\tau) dt,$$

where the template is given by $$u(t) = \sum_{n=0}^{N-1} p(t - uT_f) \quad (19)$$

Then the start time of the preamble of $\hat{\tau}_0$ is determined by searching the peak of the output of the sliding correlation detector (18). The time where the peak appears is considered as the estimate of the start time, i.e., $$\hat{\tau}_0 = \underset{0 \leq \tau \leq NT_f}{\operatorname{argmax}} \{R_{pre}(\tau)\} \quad (20)$$

In order to show the benefit of time reversal, assume that the elastic wave propagation channel is quasi-static and can be described by a tapped-delay line model $$h(t) = \sum_{i=0}^{L-1} \alpha_i \delta(t - \tau_i), \quad (21)$$

where $\alpha_i$ is the gain coefficient of the i-th path and $\tau_i$ is the corresponding time delay. L is the total number of the channel paths. We can show that, due to time reversal, the autocorrelation term in is dominant, i.e., inserting (21) in (17), we obtain $$R_{pre}(\tau) = \int_0^{NT_f} \left( \sum_{n=0}^{N-1} p(-t+nT_f) * \sum_{i=0}^{L-1} \alpha_i \delta(-t-\tau_i) * \sum_{j=0}^{L-1} \alpha_j \delta(-t-\tau_j) \cdot \sum_{m=0}^{N-1} p(-t-mT_f - \tau) \right) dt \quad (22)$$

It is well known that by time reversal, the autocorrelation between multipath components is much larger than the cross-correlation terms, which implies that the cross-correlation term is negligible compared with the cross-correlation term. Hence, $$R_{pre}(\tau) \approx \sum_{i=j=0}^{L-1} \sum_{n=m=0}^{N-1} \alpha_i^2 R_{pp}(\tau) = N \sum_{i=j=0}^{L-1} \alpha_i^2 R_{pp}(\tau) \quad (23)$$

Hence, the timing estimate in (20) can be re-written as $$\hat{\tau}_0 = \underset{0 \leq \tau \leq NT_f}{\operatorname{argmax}} \{R_{pre}(\tau)\} \approx \underset{0 \leq \tau \leq NT_f}{\operatorname{argmax}} \left\{ N \sum_{i=j=0}^{L-1} \{\alpha_i^2 R_{pp}(\tau)\} \right\} \quad (24)$$

Once the preambles timing $\hat{\tau}_0$ is determined, the start time of the data symbols will be $\hat{\tau}_0 + T_g$.

The receiver will then perform demodulation using either an energy detector or a coherent detector.

The present disclosure also provides a non-transitory computer readable storage medium storing a program which, when executed by a computer, causes the computer to perform a method for transmitting data. The method includes time reversing a signal, such as, for example, time reversing the received signal at sensor A, as discussed, for example, in step-2 above; modulating the time reversed signal using time reversal pulse position modulation to generate a time reversed pulse position modulated signal, as discussed, for example, in step-3 above; and using the time reversed pulse position modulated signal to transmit data in accordance with the present disclosure. The non-transitory computer readable storage medium can include, for example, a CD-ROM, flash memory drive, hard drive, DVD, etc. capable of storing the program.

4. Simulation Studies

In this section, we present the time reversal PPM modulation and demodulation for signals transmitted through a simulated dispersive channel. We conduct simulation studies under two scenarios to examine the performance of the data communication scheme according to the present disclosure. In the first scenario, the retransmitted signal $\hat{s}(t)=y(-t)$ as described by (12). In the second scenario, the signal $\hat{s}(t)$ is the truncated $y(-t)$ in the time domain. The waveform truncation is necessary because the time span of the signal $y(-t)$ could be too long due to channel dispersion.

4.1 Performance with Full Waveform Transmission

Figure 4:
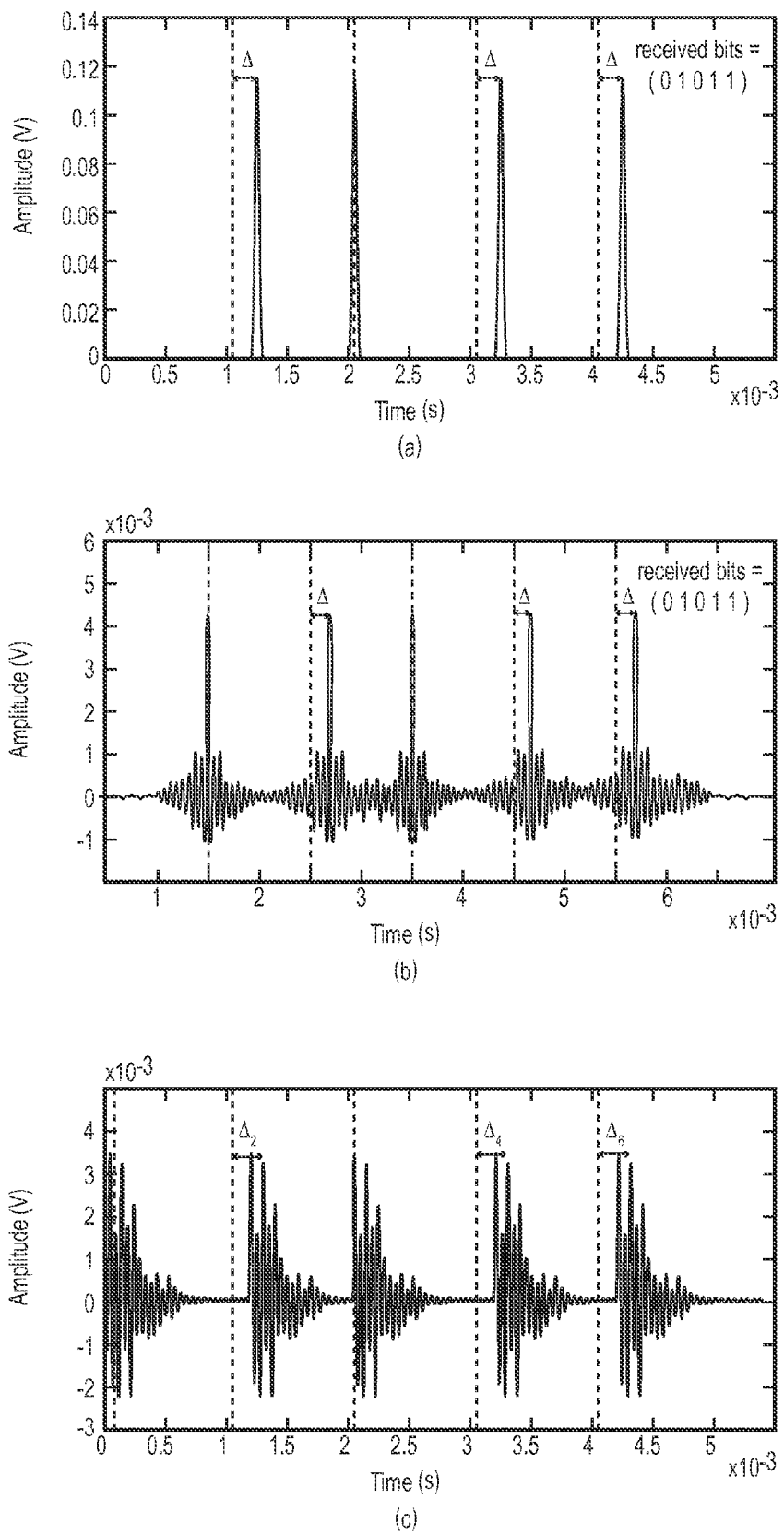
FIG. 4 depicts simulated received signals for demodulation. The originally transmitted information bits are [0 1 0 1 1]. The goal is to produce synchronized and focused waveforms for demodulation and detection. The received signal should show the displacement of 0, Δ, 0, Δ, and Δ, respectively, which enables accurate timing acquisition (i.e., synchronization) and demodulation. (a) Received signal under ideal non-dispersive channel; (b) received time-focused signals using time reversal PPM modulation; and (c) received time spread signals using conventional PPM modulation. Received signals show severe time spreading due to transmission channel dispersion thus resulting in poor synchronization and detection.

Under this scenario, the total received signal will be time-reversed and re-transmitted. FIG. 3(a) depicts the transmitted Gaussian pilot signal p(t). FIG. 3(b) shows a simulated multipath channel h(t). This channel shows severe time spreading. Assume that the information bits to be transmitted are [0 1 0 1 1]. FIG. 4(a) depicts a focused peak which allows for accurate synchronization and demodulation, while FIG. 4(b) showing that the received signal is significantly spread, which causes inaccurate synchronization and demodulation.

4.2 Performance with Waveform Truncation

We let $T_0$ denote the time duration of the signal $y(-t)$. We notice that in guided wave excitation and reception, $T_0$ would be very large number relative to the original pulse duration T for p(t), thus, waveform truncation becomes necessary. Under this scenario, the received signal will be truncated before time reversal for re-transmission. The truncated signal becomes $$\hat{s}(t) = \begin{cases} y(-t) & 0 < t < T'_0 \\ 0 & T'_0 \leq t < T_0 \end{cases} \quad (16)$$

where $T'_0$ is the waveform duration of the truncated signal in (16). The amount of signal truncation is determined by the energy ratio given below $$\rho = \frac{E_S}{E_0} \quad (17)$$

where $E_0$ is the signal energy of the re-transmitted signal without truncation. The waveform duration for s(t) is $T_0$. We let $E_s$ denote the signal energy with truncation. The truncated waveform is of duration $T'_0 < T_0$. The energy expressions are given by $$E_0 = \int_0^{T_0} |s(t)|^2 dt \quad (18)$$

$$E_S = \int_0^{T'_0} |\hat{s}(t)|^2 dt \quad (19)$$

Figure 5:
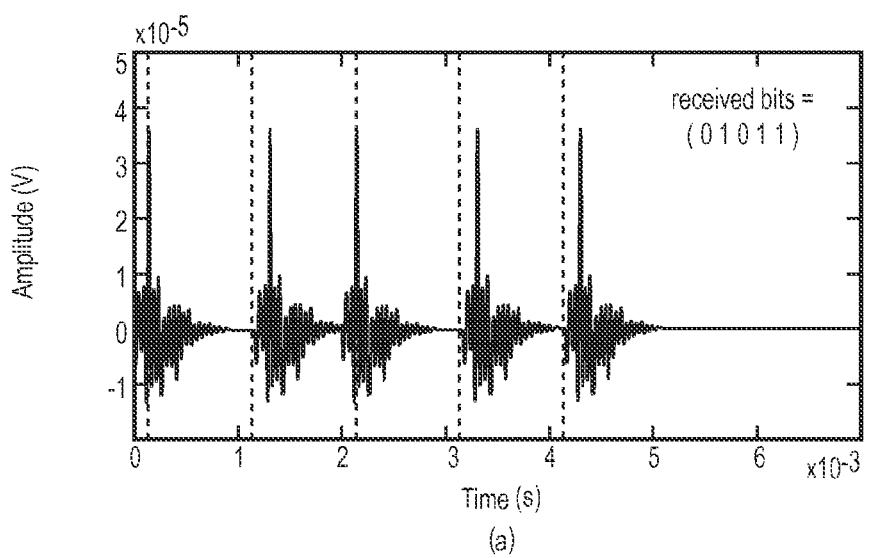
FIG. 5 depicts the simulated received time reversal PPM signals for demodulation with waveform truncation. The original transmitted information bits are [0 1 0 1 1]. (a) Received time-focused signals using time reversal PPM modulation with twenty percent energy reduction; and (b) received time-focused signals using time reversal PPM modulation with fifty percent energy reduction.
Figure 5:
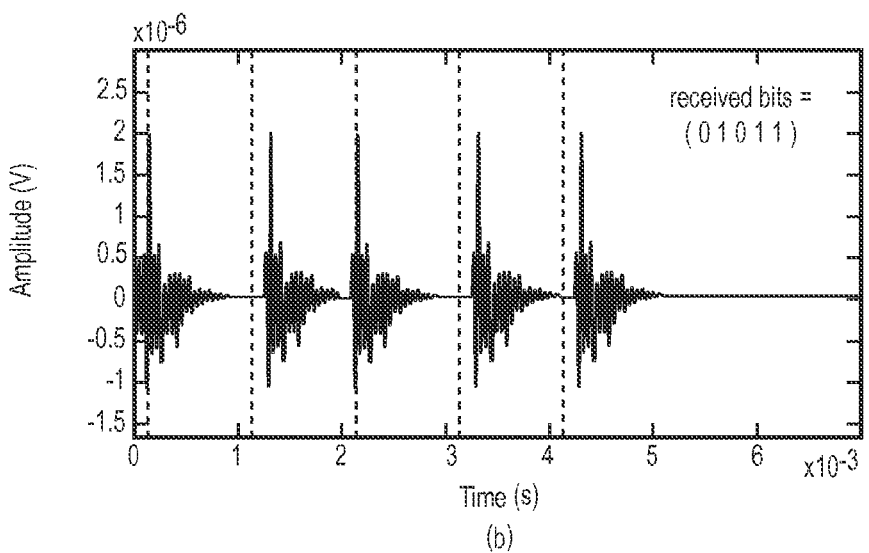

A value of ρ=0.5 means that fifty percent of the signal energy is retained after truncation. FIGS. 5(a) and (b) depict the received TR-PPM modulated waveform when signal truncation is performed. The truncation ratio, defined as 1−ρ, is at 20% and 50% respectively. The results show that waveform truncation yields focusing peaks with reduced peak amplitude compared with the un-truncated case. However, the information carrying signals can still be demodulated accurately.

5. Conclusion

Part I develops a time reversal based pulse position modulation scheme that realizes data communication on steel pipes using guided elastic waves. Unlike conventional communication modalities such as wireless radio communication and underwater acoustic communication, the developed data communication scheme utilizes steel pipes as a communication channel and elastic waves as message carriers. In order to overcome the severe channel dispersion due to guided elastic wave propagation, we utilize time reversal method to compensate for the dispersion thus achieving signal synchronization for signal demodulation. Simulation studies demonstrate the success of the developed scheme.

PART II

Experimental Studies

1. Introduction

One of the key features of next generation embedded piezoelectric sensor network systems for heath monitoring of large civil structures such as pipelines and offshore platforms is their abilities for data communication between sensor nodes. Conventional communication modalities such as radio waves, cables, and acoustical waves oftentimes are not practical or too costly in field applications where the structures are underground or immersed in water. In the present disclosure, we propose a new method that utilizes elastic waves as information carriers and steel pipes as transmission channels. Piezoelectric sensors can thus communicate with each other and delivery critical information regarding the status of the integrity of the structures.

However, due to the multi-modal and dispersion nature of the guided elastic waves that propagation on solid medium, data communication over steel pipes using elastic waves requires novel designs of transmission waveform and modulation/demodulation scheme. Guided elastic waves that propagate along steel pipes consist of multiple modes, and each wave mode has different propagation speed over a wide range of frequencies. Guided waves in steel pipes, also called pipe waves, consist of longitudinal waves, torsional waves, and flexural waves. Thus, received elastic wave signals may contain all these modes with various propagation velocity characteristics.

As a result, the propagation medium becomes highly dispersive. From a communication system design perspective, this level of transmission channel dispersion significantly reduces the quality of the received signals for detection and demodulation. Part I shows that time reversal is a viable approach that utilizes multipath scattering to enhance signal detection. In particular, our research has shown that time reversal based radio communication improves signal to noise ratio an increases data throughput under a rich scattering environment.

Part II demonstrates by experimental data the time reversal based pulse position modulation (PPM) scheme using elastic waves on steel pipes. Part III extends the time reversal PPM scheme to piezoelectric sensor arrays. The basic principles of the TR-PPM scheme according to the present disclosure are discussed in Part I. Part II is the second part of the proposed studies. Part II is organized as follows: Section 2 presents experimental setup in a laboratory environment. Section 3 describes the steps of experimentation. Section 4 provides the experimental results. Part III provides the experimental results on sensor arrays and field test results. Conclusions are drawn in Part II, section 5 and Part III, section 2.

2. Experimental Setup

In this section, we describe the experimental setup for implementing the time reversal pulse position modulation (TR-PPM) for data communication over steel pipes.

Steel Pipe Specimen

The data communication experiments are conducted on two steel pipe specimens of length 1833 mm, outside diameter (OD) of 35 mm and wall thickness (WT) of 4 mm. The specifications of the pipe specimens are shown in FIG. 6. The two pipes have the same dimensions. Pipe I has a welded-on cap and a pressure gauge at the two ends of the pipe to control the internal atmospheric pressure from 0 pound per square inch (PSI) up to 100 PSI. This pipe does not have welds. Pipe II has a 10-mm wide welded butt joint. Pipe I with 0 PSI is considered as the baseline pipe on which the collected experimental data are thus considered as the baseline data.

Piezoelectric Sensors

Two piezoelectric wafer transducers (Lead Zirconate Titanate, PZT 5A4E) are mounted on the surface of the pipe (i.e., transmission channel) using cyanoacrylate adhesive. One PZT transducer is used as the transmitter and the other as the receiver. The data collection is thus performed in pitch-catch configuration. Each PZT wafer is of 20 mm long and 8 mm wide. The two PZT wafer transducers are located 1200 mm apart on the pipe. The specifications of the PZTs are shown in FIG. 6.

Signal Transmission and Data Acquisition System

The signal transmission and data acquisition unit is a National Instruments (NI) PXI system which consists of an arbitrary waveform generator (AWG) and a digitizer/oscilloscope. The waveform generator has a sampling rate 100 MS/s and a 16-Bit resolution. The AWG can generate arbitrary waveforms in response to the dispersive medium, thus implementing time reversal. The digitizer has a sampling rate of 100 MS/s and a 14-Bit resolution. The waveform generator drives the transmitter sensor. The digitizer is connected to the receiver sensor and records waveforms.

3. Experimentation of TR-PPM

In this section, we implement the three steps of the time reversal PPM according to the present disclosure and which is described in Part I and is also depicted in FIG. 7.

Step 1: Channel Sounding:

In this step we measure the channel response, denoted by h(t), of the pipe between the transmitter and the receiver using a probe signal. We choose a modulated Gaussian pulse $$p(t) = Ae^{-\left(\frac{t-t_0}{T}\right)^2} \cos(2\pi f_c t) \tag{20}$$

as the probe signal, where $f_c$ is the center frequency of the modulation signal, T=2 μs is the pulse width, $t_0$ is the time offset from t=0, and A is the amplitude. The total transmission energy is defined as $$E_p = \int_{-\infty}^{\infty} |p(t)|^2 dt \tag{21}$$

Throughout our test, we choose the center frequency at $f_c$=250 kHz and the signal bandwidth at 500 kHz. Compared to narrowband excitation, a wideband pulse excitation gives rise to more modes and more dispersion, which are beneficial for time reversal. For channel sounding purposes, a modulated Gaussian pulse gives rise to a smooth spectrum over a wide frequency range. For PZTs with different sizes and coupling conditions, the optimal excitation frequency that results in highest intensity of the reflected elastic waves may vary. The excitation frequency range we choose includes the optimal frequency for the PZT sensors used in the experiment. The sampling frequency is chosen to be at 2 MHz, four times as much as the maximum frequency of the modulated Gaussian pulse in order to reconstruct the sampled digital signal into the analog waveform in high fidelity. The signal is amplified 10 times by a built-in amplifier in the NI's data acquisition system. The maximum voltage of the Gaussian pulse is 10 V. The sounding waves are recorded at the digitizer. In order to reduce the measurement noise, the experiment is repeated 10 times and those 10 data snapshots are averaged.

Step 2: Time Reversal:

The channel response h(t) that characterizes the elastic wave propagation between two points on a steel pipe is known highly dispersive. This implies that the received signal through by a conventional transmission has a severe time spread. To compensate for the signal fading caused by transmission channel dispersion, we apply the time reversal technique in order to achieve focused signals. To realize time reversal, the received signal is time-reversed and energy-normalized, and then fed back to the wave generator. We let y(t) denote the received signal, then the time reversed signal is y(−t). Note that energy normalization of y(−t) is necessary to ensure the newly constructed transmission waveform has the same energy as the Gaussian pulse transmission used in the channel sounding experiment. The length of the recording at the digitizer is twice as much as the length of the received signal attained from Step 1.

Step 3: Data Transmission Via Time Reversal PPM:

The time reversed signal y(−t) obtained in Step 2 is employed as a basic waveform for message data transmission. The message data are a stream of binary digits, i.e., "0"s and "1"s. The data streams are coded through relative pulse shifts within each data frame using the time reversed signal y(−t). Thus modulated signal takes the form of $$s(t) = \sum_{i=0}^{M-1} ky(-t)\delta(t - iT_f - c_j\Delta) \tag{22}$$

where $c_j \in \{0, 1\}$ is the binary data to be transmitted, $T_f$ is the frame time to send one bit data, $\Delta$ is the additional time shift to distinguish between the pulses carrying the bit "0" or "1". $\delta(\cdot)$ is the Dirac delta function. The energy-normalization coefficient in (3) is given by $$k = \sqrt{\frac{E_p}{E_y}} \tag{23}$$

where the total energy for signal y(−t) is given by $$E_y = \int_{-\infty}^{\infty} |y(-t)|^2 dt \tag{24}$$

Figures 8, 9:
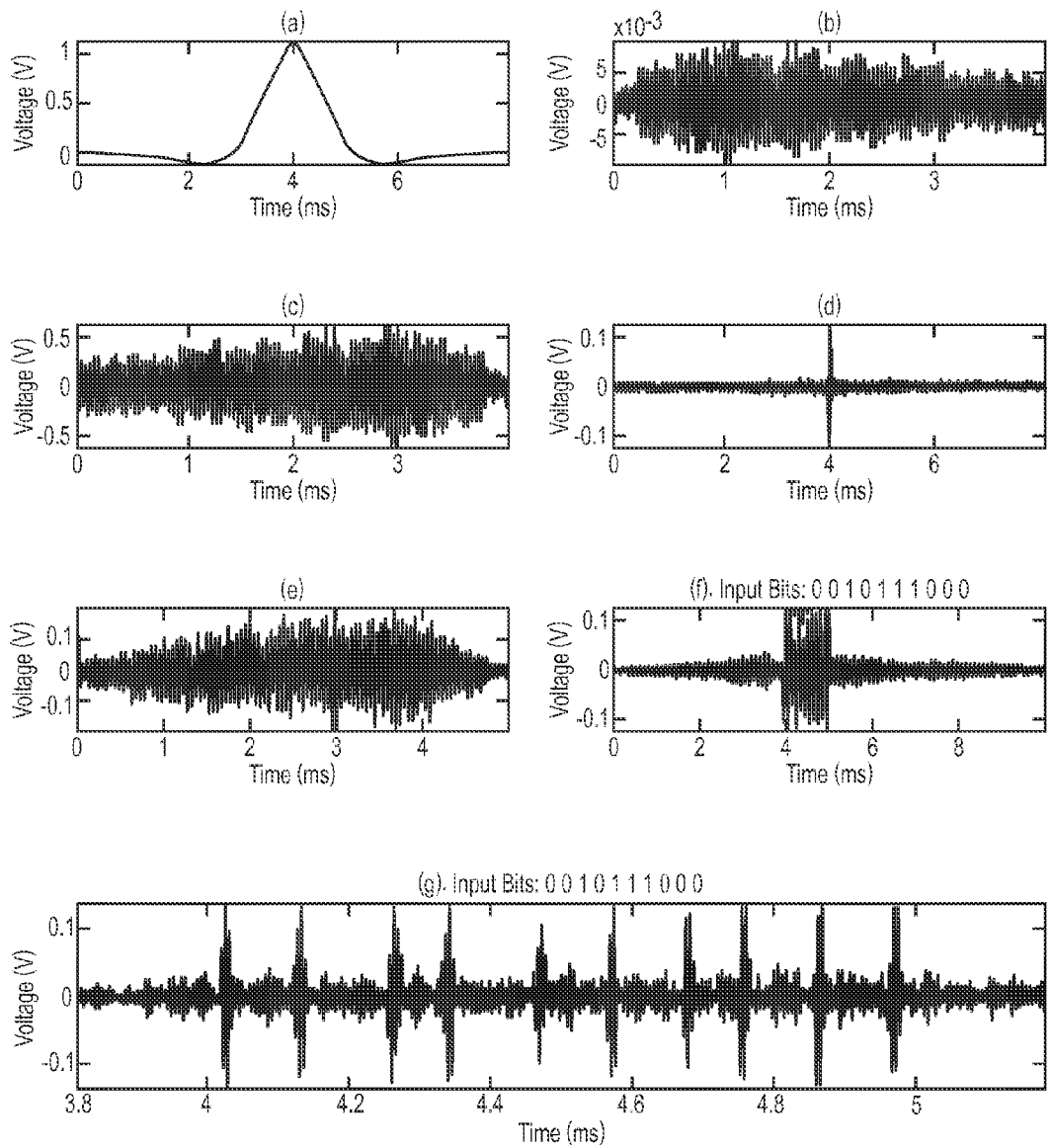
FIG. 8 is a table of the test parameters for the time reversal communication experiment.
FIG. 9 depicts the snapshots of waveforms obtained experimentally from the time reversal based communications on a baseline pipe with a data rate of 10 kbps. Time averaging of N=10 waveforms is employed. The transmitting bit stream is [0 0 1 0 1 1 1 0 0 0]. (a) Gaussian pilot signal; (b) received response after channel sounding, (c) time reversal transmission; (d) received time reversal focused waveform; (e) modulated time reversal PPM waveform; (f) received information carrying waveforms, and (g) zoomed-in plot of (f). The vertical dash lines indicate the starting points of symbol frames.

In our experiments, the message data is a series 10 binary numbers "0" or "1" randomly generated by LabView programming. The frame time is determined by the prescribed transmitting data rate, given by $$T_f = \frac{1}{R} \tag{25}$$

where R is the data rate. The tests were carried out at the data rates of 10 kbps, 20 kbps, and 50 kbps which correspond to the frame time of 100 μs, 50 μs and 20 μs, respectively. In order to restore the transmitted bit data, the time shift should be larger than the full width of the single Gaussian pulse. Here we use one fourth of the frame time as the time shift Δ. All the parameters for the time reversal communication experiment are shown in FIG. 8. The record length is mainly determined by the length of the modulated time reversal signal. Here we use twice of the signal length for signal recording at the digitizer.

4. Experimental Results

In this section, we present experimental results of the time reversal PPM communications according to the present disclosure on two pipe specimens under four different laboratory test scenarios (see FIG. 6 for specifications). On Pipe I, experiments were carried out under three pressure levels at 0 PSI, 50 PSI, and 100 PSI, respectively. The test under 0 PSI is used as a baseline. On Pipe II, there is a welded butt joint. No internal pressure is applied. Under each scenario, we test the communication scheme according to the present disclosure under three transmission data rates at 10 kilo-bits-per-second (kbps), 20 kbps, and 50 kbps, respectively. Furthermore, to reduce the random noise in the received signal y(−t), we collect N=10 data snapshots and carry out averaging. The performance of the communication scheme is tested with/without averaging the recorded waveforms. The test parameters are shown in FIG. 8. All data was collected by LabView and displayed in Matlab.

4.1 Baseline Study

We first conduct a baseline study on Pipe I. This is a seamless steel pipe of 1833 mm long, 70 mm outside diameter and 4 mm wall thickness, with no welds and an internal pressure of 0 PSI. Two PZT wafer transducers were located 1200 mm apart on the pipe. Each wafer transducer has dimension of 20 mm long and 8 mm wide. FIG. 9 depicts the various signals collected in the experiment. FIG. 9(*a*) shows a modulated Gaussian waveform with 250 kHz center frequency and 500 kHz bandwidth. FIG. 9(*b*) shows the received signal ŷ(t)=$\Sigma_{r=1}^{N}$ln(t), N=10, which is obtained by averaging 10 independently collected data $y_i$(t). Due to the presence of multiple guided wave modes and dispersion of the cylindrical pipe, this signal is severely distorted compared with the originally transmitted pilot signal shown in FIG. 9(*a*). The severe signal dispersion makes it very difficult to interpret the signal, let alone achieving meaningful data communication.

In order to overcome the channel dispersion, we apply time reversal. FIG. 9(*c*) shows the time-reversed and energy normalized signal kŷ(−t) to be transmitted. This signal propagates through the same medium and yields a highly focused waveform show in FIG. 9(*d*). The focused waveform has a clear peak indicating that all the wave modes arrive at the receiver coincidentally. Moreover, this peak implies a significant increase of the signal maximum amplitude, as compare to the response of the received signal after conventional channel sounding in FIG. 9(*b*), from 8.5 mV to 138.5 mV, a 24.2 dB increase. The increase of signal amplitude improves the signal-to-noise ratio, thus enabling successful signal detection and synchronization.

Based on the wave focusing principle of time reversal, we construct the modulated time reversal transmission with PPM scheme by mapping a randomly generated a sequence of ten binary bits, [0 0 1 0 1 1 1 0 0 0], to a stream of pulse position modulated signals using the time reversal waveform. The mathematical form of the signal stream with different delays is given by (22). The new transmission waveform is shown in FIG. 9(e), where we can hardly observe the message data.

However, transmitting this waveform along the pipe leads to ten prominent peaks (FIG. 9 (f)). If we zoom in on FIG. 9(f), the received response clearly presents the original input bit stream. We use red vertical dash lines, with a 100 μs interval, to mark the starting position of each frame. The peaks that collinear with the frame starting points indicate the "0" bit is transmitted. The peaks with a 25 μs time shift from the frame starting point imply that the "1" bit is transmitted. By this decoding rule, the information bits that carried by the received waveform can be decoded. FIG. 9(g) shows that the series of time reversal focused waveforms from which all the transmitted information bits can be correctly recovered. This set of experiments show that data communications can be realized on a pipe by utilizing the time reversal PPM technique according to the present disclosure.

Figure 10:
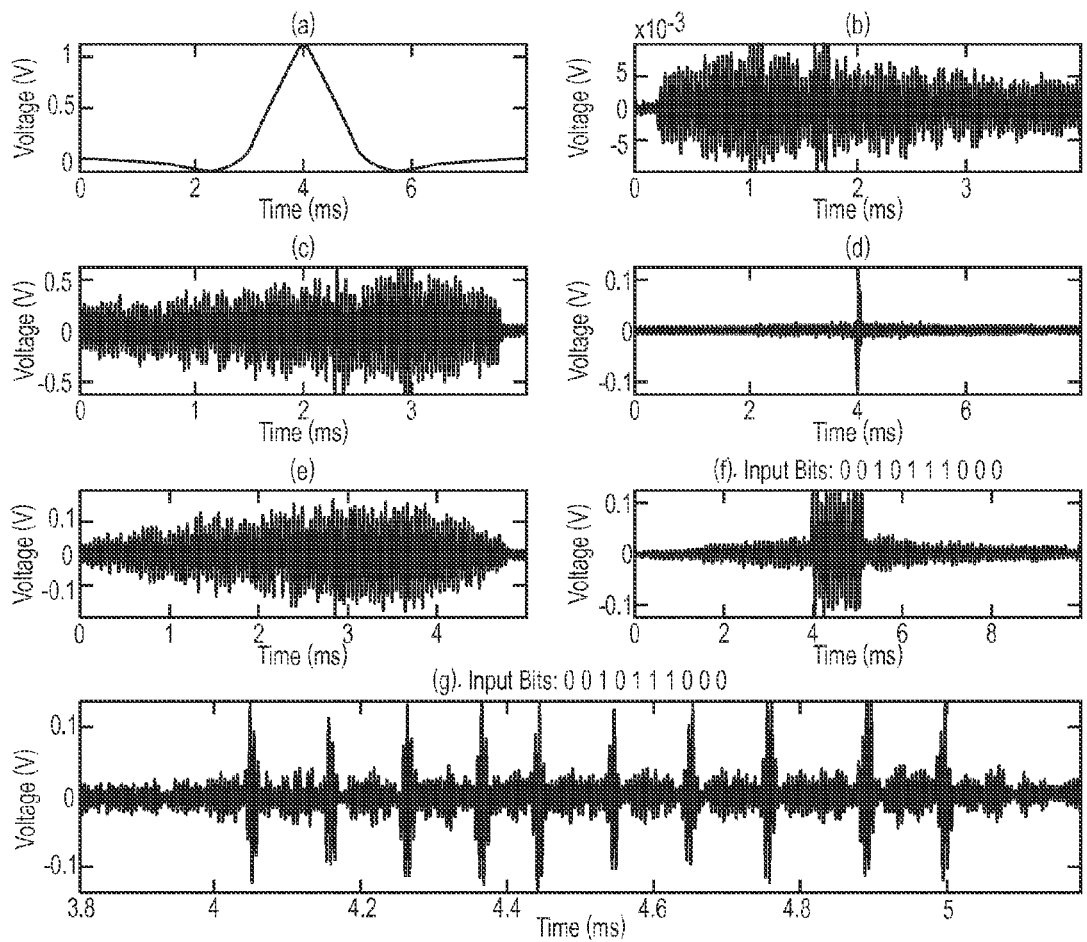
FIG. 10 depicts the snapshots of the waveforms obtained experimentally from the time reversal based communications on a baseline pipe with a data rate of 10 kbps. No time averaging (N=0) is employed. The transmitting bit stream is [1 1 1 1 0 0 0 0 1 1]. (a) Gaussian pilot signal; (b) received response after channel sounding; (c) time reversal transmission; (d) received time reversal focusing waveform; (e) modulated time reversal PPM waveform; (f) received information carrying waveform; and (g) zoomed-in plot of (f). The vertical dash lines indicate the starting points of symbol frames.

Next we investigate the impact of two parameters that may affect the accuracy of communication on a pipe: number of averaging N and data rate R. FIG. 10 shows the experimental results of the time reversal based communication at the rate of 10 kbps but with no waveform averaging. As a result, the noise level with no waveform averaging would be higher than when averaging is performed. However, we observe that the time reversal focusing is not affected. There is no noticeable difference between the amplitudes of the focusing peak shown in FIG. 10(d) and in FIG. 9(d). This implies that the effective signal-to-noise ratio is enhanced in spite of the presence of noise and channel dispersion.

Figure 11:
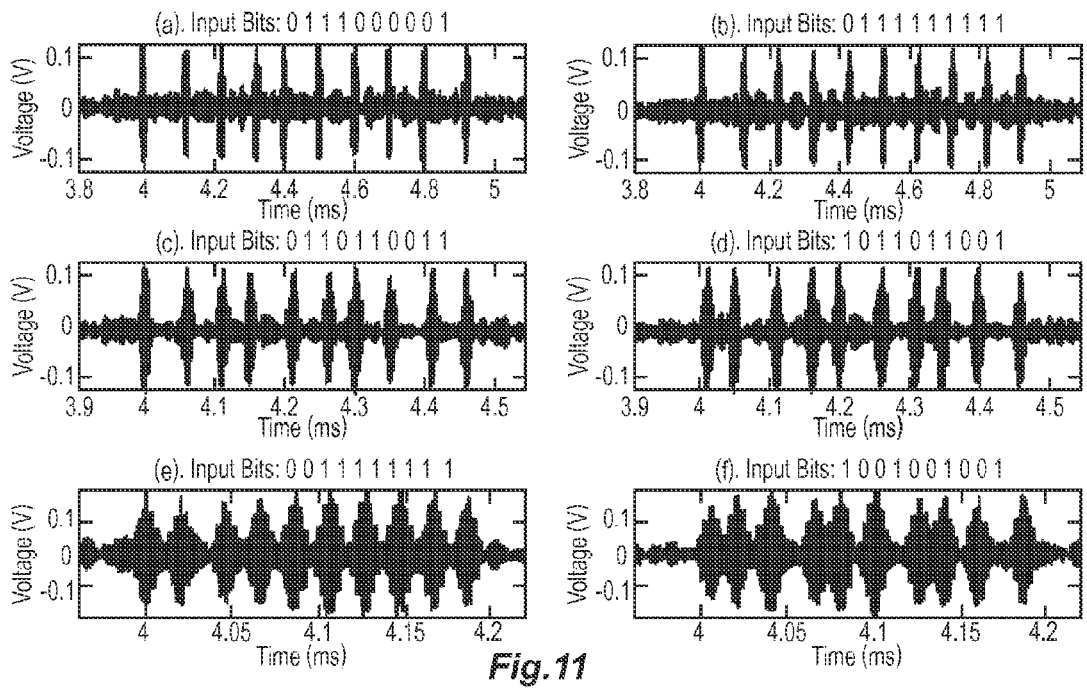
FIG. 11 depicts the snapshots of the received information carrying waveforms collected experimentally on a baseline pipe. (a) 10 kbps data rate, no averaging employed, a bit stream of [0 1 1 1 0 0 0 0 0 1]; (b) 10 kbps data rate, N=10 waveform averaging employed, a bit stream of [0 1 1 1 1 1 1 1 1 1]; (c) 20 kbps data rate, no averaging employed, a bit stream of [0 1 1 0 11 0 0 1 1]; (d) 20 kbps data rate, N=10 waveform averaging employed, a bit stream of [1 0 1 1 0 1 1 0 0 1]; (e) 50 kbps data rate, no averaging employed, a bit stream of [0 0 1 1 1 1 1 1 1 1]; and (f) 50 kbps data rate, N=10 waveform averaging employed, a bit stream of [1 0 0 1 0 0 1 0 0 1]. The vertical dash lines indicate the starting positions of symbol frames.

To further examine the throughput of the TR-PPM communication scheme according to the present disclosure, we conduct three tests of the data communication scheme according to the present disclosure on the pipe specimens at three data rates of 10 kbps, 20 kbps and 50 kbps, respectively. The results shown in FIGS. 11(a), (c), and (d) are obtained using waveform averaging (N=10) and correspond to the data rates of 10 kbps, 20 kbps, and 50 kbps, respectively. The results shown in FIGS. 11(b), (d), and (f) are obtained with no waveform averaging and correspond to the data rates of 10 kbps, 20 kbps, and 50 kbps, respectively. A careful examination of the plots indicates that all the transmitted information bits are correctly decoded. However, we notice that at 50 kbps transmitting rate, some time reversal focusing peaks start to overlap. This is because the width of those peaks becomes closer to the length of each time frame. We anticipate that if data rate continues to increase, the peaks will start becoming indistinguishable from each other. Thus decoding errors will occur.

4.2 Test on Pressurized Pipe Specimen

To validate the time reversal PPM communications according to the present disclosure under more complicated conditions, we conducted experiments on pressurized pipes. The specifications of the test scenarios are shown in FIG. 6. For the second and the third scenario, Pipe I was pressurized at 50 PSI and 100 PSI, respectively. Our earlier results have indicated that air pressure inside the pipe can reduce the amplitude of the ultrasonic waves. Here we show that the TR-PPM communication scheme according to the present disclosure can still achieve improved signal-to-noise ratio and result in accurate data transmission. The experimental results with three data rates of 10 kbps, 20 kbps, or 50 kbps, and with/without averaging are shown in FIGS. 12-13, respectively.

Figure 12:
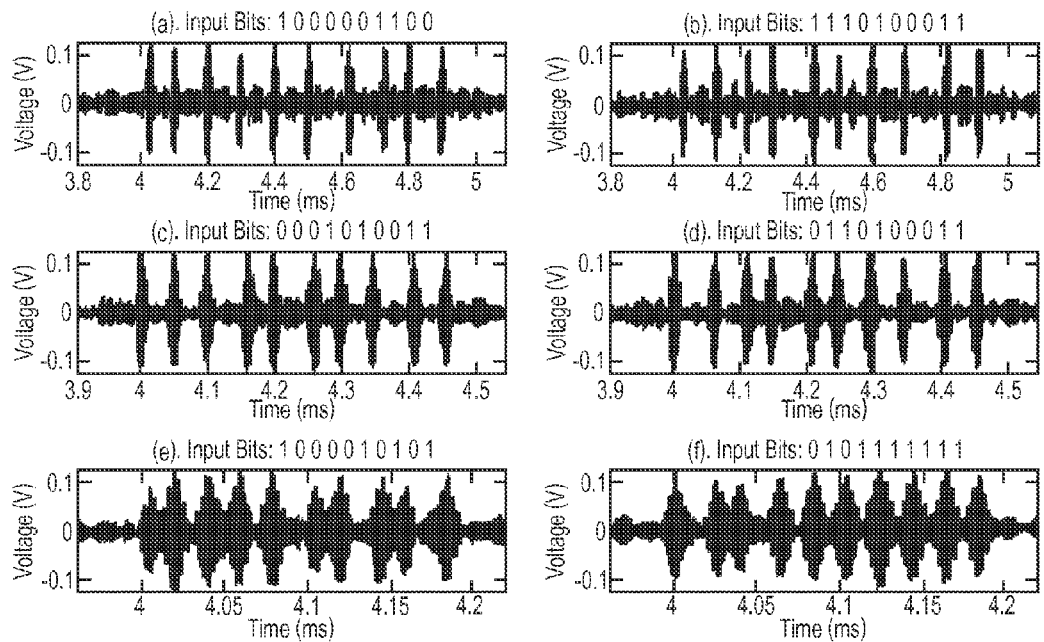
FIG. 12 depicts the snapshots of the received information carrying waveforms on a pipe specimen with an internal pressure of 50 PSI, (a) 10 kbps data rate, no averaging employed, a bit stream of [1 0 0 0 0 0 1 1 0 0]; (b) 10 kbps data rate, N=10 waveform averaging employed, a bit stream of [1 1 1 0 1 0 0 0 1 1]; (c) 20 kbps data rate, no averaging employed, a bit stream of [0 0 0 1 0 1 0 0 1 1], (d) 20 kbps data rate, N=10 waveform averaging employed, a bit stream of [0 1 1 0 1 0 0 0 1 1]; (e) 50 kbps data rate, no averaging employed, a bit stream of [1 0 0 0 0 1 0 1 0 1], and (f) 50 kbps data rate, N=10 waveform averaging employed, a bit stream of [0 1 0 1 1 1 1 1 1 1]. The vertical dash lines indicate the starting positions of symbol frames.
Figure 13:
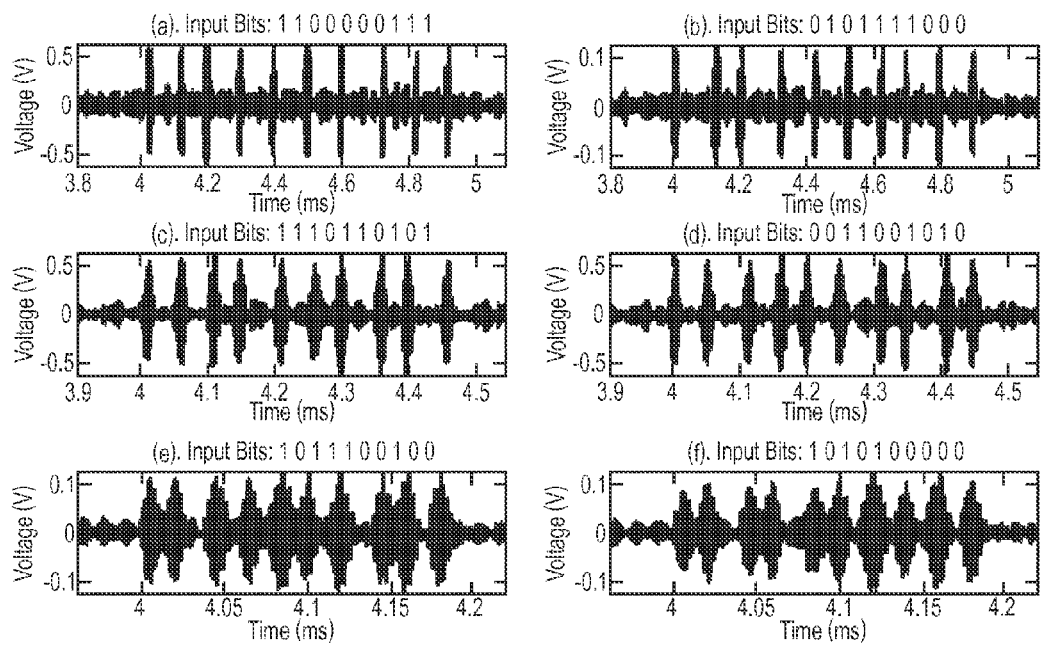
FIG. 13 depicts the received information carrying waveforms on a pipe specimen with an internal pressure of 100 PSI, (a) 10 kbps data rate, no averaging employed, a bit stream of [1 1 0 0 0 0 0 1 1 1]; (b) 10 kbps data rate, N=10 waveform averaging employed, a bit stream of [0 1 0 1 1 1 1 0 0 0]; (c) 20 kbps data rate, no averaging employed, a bit stream of [1 1 1 0 1 1 0 1 0 1]; (d) 20 kbps data rate, N=10 waveform averaging employed, a bit stream of [0 0 1 1 0 0 1 0 1 0]; (e) 50 kbps data rate, no averaging employed, a bit stream of [1 0 1 1 1 0 0 1 0 0]; and (f) 50 kbps data rate, N=10 waveform averaging employed, a bit stream of [1 0 1 0 1 0 0 0 0 0]. The vertical dash lines indicate the starting positions of symbol frames.

FIG. 12 shows the received information bits after transmission through Pipe I under internal pressure of 50 PSI. The three plots, FIGS. 12(a), (c), and (e), in the left column show the results with no waveform averaging under data rates of 10 kbps, 20 kbps, or 50 kbps, respectively. The three plots, FIGS. 12(b), (d), and (f), in the right column show the results with N=10 waveform averaging under the three data rates. Under this test scenario, waveform averaging does not result in noticeable improvements. Similarly, FIG. 13 depicts the received information bits through Pipe I under the internal pressure of 100 PSI. All the information bits are successfully decoded.

Figure 14:
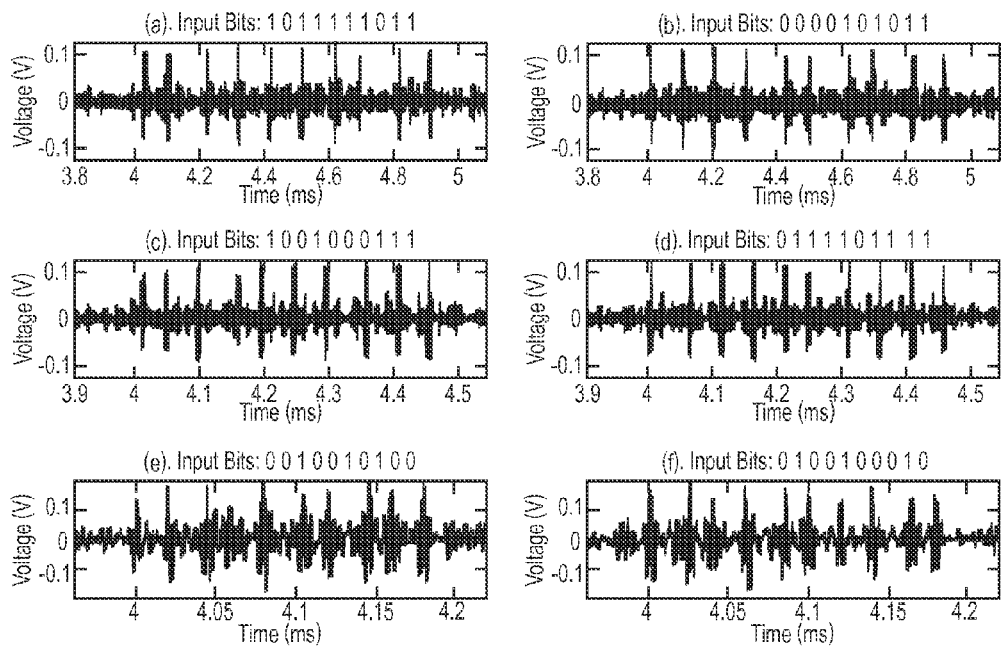
FIG. 14 depicts the received information carrying waveforms collected on a pipe specimen with a welded butt joint, (a) 10 kbps data rate, no averaging employed, a bit stream of [1 0 1 1 1 1 1 0 1 1]; (b) 10 kbps data rate, N=10 waveform averaging employed, a bit stream of [0 0 0 0 1 0 1 0 1 1]; (c) 20 kbps data rate, no averaging employed, a bit stream of [1 0 0 1 0 0 0 1 1 1]; (d) 20 kbps data rate, N=10 waveform averaging employed, a bit stream of [0 1 1 1 1 0 1 1 1 1]; (e) 50 kbps data rate, no averaging employed, a bit stream of [0 0 1 0 0 1 0 1 0 0]; and (f) 50 kbps data rate, N=10 waveform averaging employed, a bit stream of [0 1 0 0 1 0 0 0 1 0]. The vertical dash lines indicate the starting positions of symbol frames.

In the fourth scenario, we investigate the effect of a weld on the data communication in a pipe. A weld is a common and important structure that typically appears in long range pipelines. Examining whether the time reversal based communication can be accomplished in a welded pipe has significant meanings. Pipe II is nominally identical to Pipe I except that there is a 10-mm-wide welded butt joint located 900 mm from one end of the pipe. The size and location of the two PZTs as well as the excitation signal, a 250 kHz Gaussian pulse, are the same as those for the baseline pipe (see FIG. 6). Similar to the received signals observed in the baseline pipe or the pipe with internal pressure, time reversal provides a great spatial and temporal focusing of guide waves in the pipe, and the time reversal peaks clearly convey the stream of binary data, as shown in FIG. 14. We also notice that the peaks appear to be sharper and cleaner than those in the plots of FIGS. 11-13. Our interpretation is that this may be caused by the welded joint, or by the different bonding conditions of the PZTs on the two specimens. Further study needs to be done to give appropriate interpretations.

All the experimental results show that time reversal data communications can be achieved on pipes using guided elastic waves. The propose TR-PPM method provides a potential alternative to data communication between sensor nodes for conventional structural health monitoring applications.

5. Conclusion

Part II demonstrates the time reversal pulse position modulation for data communication using pipe waves on steel pipes in a laboratory environment. Time reversal is an adaptive waveform transmission scheme that can compensate for the channel dispersion in wave propagations. By experimental demonstration on two steel pipes under various transmission conditions, we show that the time reversal pulse position modulation according to the present disclosure successfully transmits and recovers information bits over highly dispersive multi-modal elastic channels such a steel pipe.

PART III

Experimental Studies Using Sensor Arrays 1.1 Experimental Tests Using Transducer Sensor Arrays We investigate the feasibility of utilizing transducer array to improve TR communication accuracy. The experiments were performed on a carbon steel pipe specimen 20 (see FIG. 15), 1.833 mm in length, 70 mm in outside diameter and 4 mm in wall thickness. PZT wafer transducers (PSI-5A4E, Piezo Systems, Inc., Cambridge, Mass.) 10 and 30 were mounted on the surface of the pipe 20 using cyanoacrylate adhesive. The two transducers 10, 30 are part of a sensor network. The sensor network further includes a controller 50 capable of executing programmable instructions for monitoring the health, condition and other parameters of the pipe 20 in accordance with the present disclosure. The controller 50 also performs data communications. Each wafer was 12 mm long and 6 mm wide. The transducers 10, 30 were connected to a National Instrument (NI) PXI chassis for data collection. We used an NI 5421 Arbitrary Waveform Generator to excite a transmitting PZT, and a synchronized NI 5122 Digitizer to record signals from two receiving PZTs 30. (see FIG. 15). The distance between the transmitter 10 and the two receivers 30 was 1.5 m.

We transmitted a stream of 1000 randomly generated bits at 10 kbps, 20 kbps, 50 kbps, and 100 kbps, and repeated the tests for multiple trials. The test parameters are shown below.

TABLE 1

Test Parameters for TR-PPM Communications:

| Data Rate (kbps) | Frame Time (μs) | # of Bits Trans-mitted | Sampling Frequency (MHz) | Center Frequency (kHz) | Band-width (kHz) | Time Shift (μs) | # of Trials |
|---|---|---|---|---|---|---|---|
| 10 | 100 | 1000 | 2 | 250 | 500 | 25 | 40 |
| 20 | 50 | 1000 | 2 | 250 | 500 | 12.5 | 40 |
| 50 | 20 | 1000 | 2 | 250 | 500 | 5 | 40 |
| 100 | 10 | 1000 | 2 | 250 | 500 | 2.5 | 40 |

Figure 16:
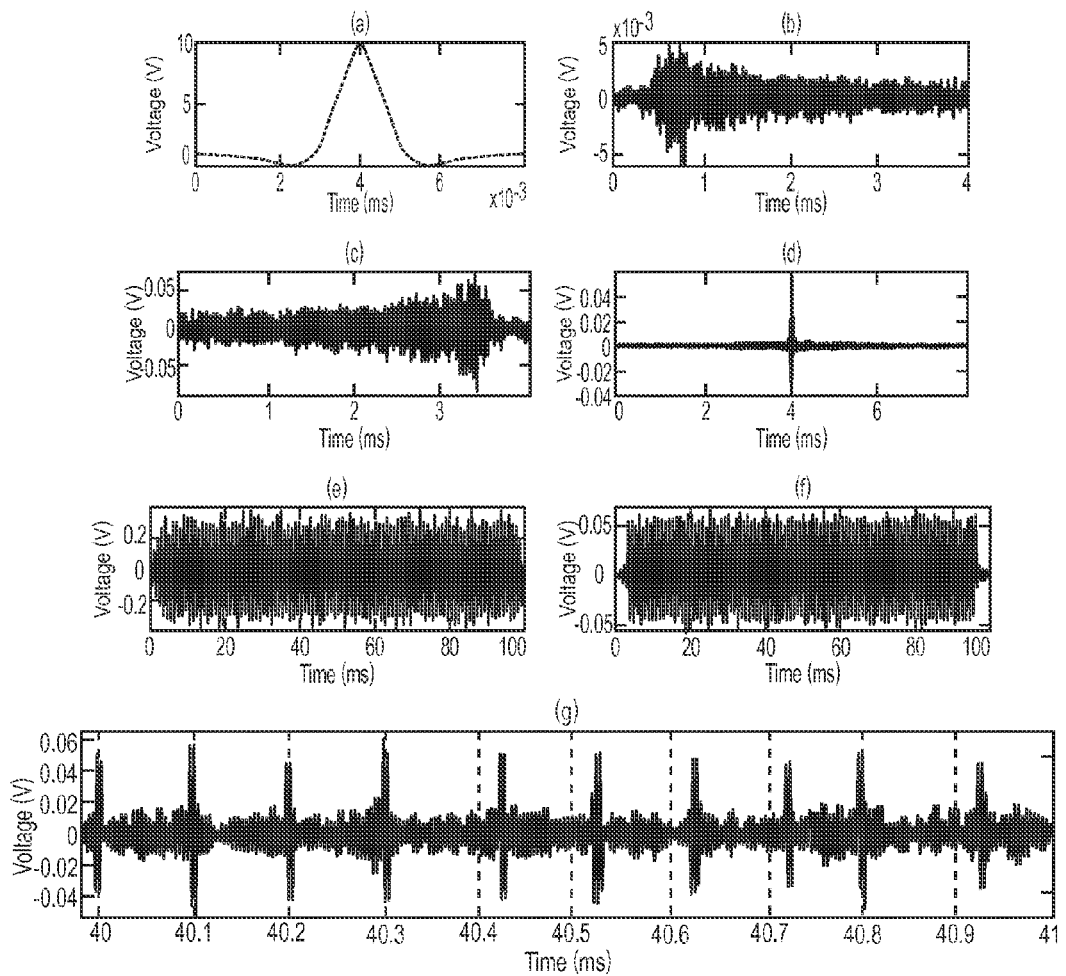
FIG. 16 depicts the snapshots of waveforms obtained experimentally from the time reversal based communications on a carbon steel pipe specimen at a data rate of 10 kbps. (a) Gaussian pilot signal, (b) received response after channel sounding, (c) time reversal transmission, (d) received time reversal focused waveform, (e) modulated time reversal PPM waveform, (f) received information carrying waveforms, and (g) zoomed-in plot of (f). The dash lines indicate the starting positions of symbol frames; the transmitted bits in the 40 ms-41 ms time window are [0 0 0 0 1 1 1 1 0 1].

FIG. 16 illustrates the three steps of the TR communications. FIGS. 16 (a) and (b) show that transmitting a short 8 μs Gaussian pulse yields a long series of arrivals at the receiving end, as a result of multi-modal and dispersive guided waves in a cylindrical shell. The ultrasonic waves can propagate long distance in solid media. However, the complex waveform makes it very difficult to achieve data communications using traditional techniques. FIGS. 16 (c) and (d) show that by transmitting a time-reversed signal response a much simpler waveform with a strong peak occurs at the center is observed. Time reversal signal processing effectively focuses the multiple dispersive wave modes and enhances the signal to noise ratio (the y-axis scales vary in different plots).

FIGS. 16 (e) and (f) show the snapshots of the waveforms of the time reversal communication steps, with a modulated time reversal PPM waveform as transmission. The transmission waveform is a superposition of 1000 time reversed waveforms (see FIG. 16 (c)) with certain time shift. The PPM waveform is scaled to avoid saturation of the wave generator. The received information carrying waveform consists of a series of focused peaks whose positions within a frame indicate a bit stream. FIG. 16 (g) is a zoomed-in plot of FIG. 16 (f). The red dash lines indicate the starting positions of symbol frames; the transmitted bits within the 40 ms-41 ms time window are [0,0,0,0,1,1,1,1,0,1].

A 500 kHz-600 kHz band-pass filter was applied during data acquisition, to remove low frequency vibrations and high frequency electrical noise. The filtering also prevented saturation of the PPM waveform due to DC drift.

Figure 17:
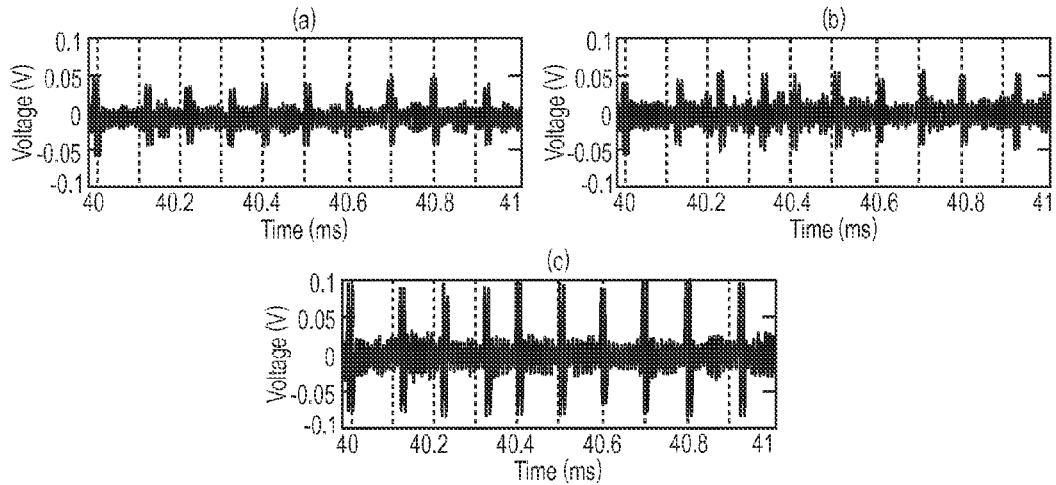
FIG. 17 depicts the snapshots of waveforms obtained experimentally from the time reversal based communications on a pipe specimen filled with water at a data rate of 10 kbps. The zoomed-in views of received information carrying waveforms are collected from (a) channel 1, (b) channel 2, and (c) the superposition of the two channels. The dash lines indicate the starting positions of symbol frames; the transmitted bits in the 40 ms-41 ms time window are [0 1 1 1 0 0 0 0 0 1].

FIG. 17 shows the snapshots of the waveforms obtained from the time reversal based communications on a pipe specimen filled with hot water, at a data rate of 10 kbps with the zoomed-in views of the received information carrying waveforms from the two receivers (see FIGS. 17 (a) and (b)), and the superposition of the two waveforms (see FIG. 17 (c)). Combining the waveforms from the two channels increases the time reversal peak levels against a large amount of undesirable "noise". Consequently, we observe clearer peaks in the data frames indicating the bit stream. The red dash lines indicate the starting positions of symbol frames. The transmitted bits in the 40 ms-41 ms time window are [0, 1, 1, 1, 0, 0, 0, 0, 0, 1].

Figure 18:
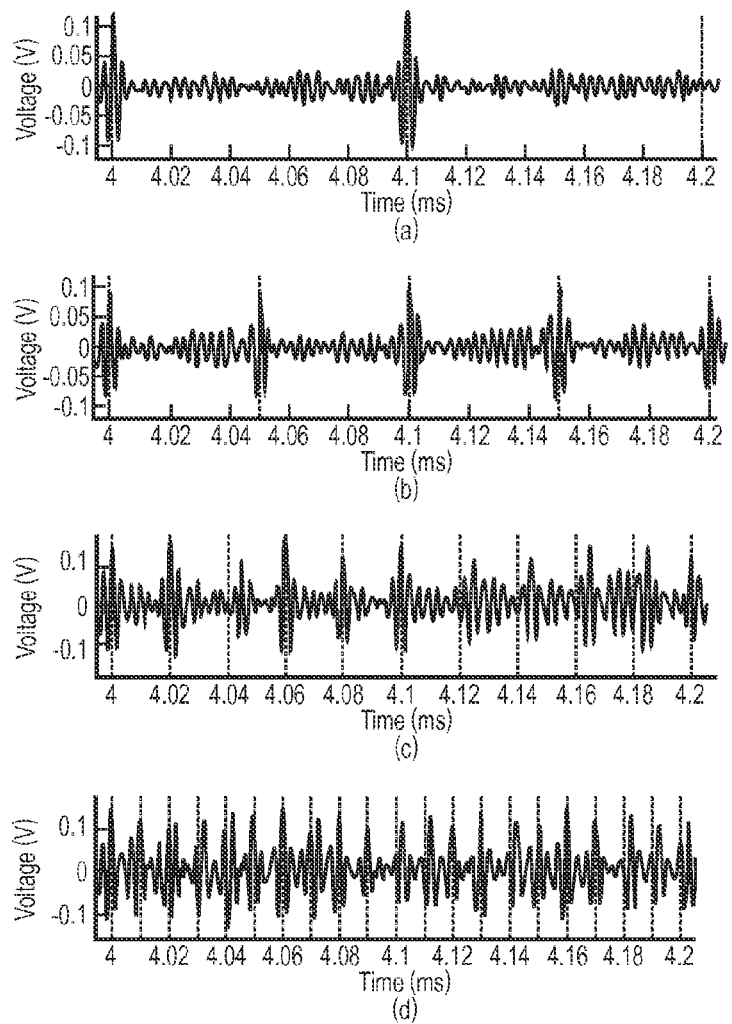
FIG. 18 depicts the snapshots of the combined received information carrying waveforms on a carbon steel pipe specimen using a 2-element transducer array at a data rate of (a) 10 kbps, (b) 20 kbps, (c) 50 kbps, and (d) 100 kbps, respectively.

FIG. 18 depicts the snapshots of the combined information carrying waveforms from the two channels (Channel 1 and Channel 2) obtained at the data rates of 10 kbps (see FIG. 18 (a)), 20 kbps (see FIG. 18(b)), 50 kbps (see FIG. 18(c)), and 100 kbps (see FIG. 18(d)), respectively.

Figure 19:
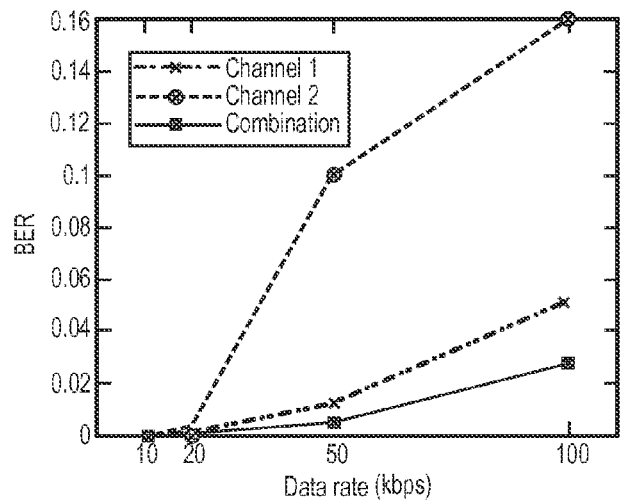
FIG. 19 depicts the calculated bit error rate (BER) for channel 1, channel 2 and the combined channel using a 2-element transducer array versus the data rates of 10 kbps, 20 kbps, 50 kbps, and 100 kbps, respectively.

We apply a peak detector to demodulate the bit steams in 40 trials at each transmission data rate, and plot the average BER in FIG. 19. The results show that we receive higher BER as the data rate is increased. Moreover, the two receivers present different communication performance due to different bounding conditions on the pipe surface. The combination of the four channels achieves the best result, resulting in about 0.02 error rate even at a data rate of 100 kbps (see Table 2).

TABLE 2

| Bit error rate (BER) Performance | | | | | |
|---|---|---|---|---|---|
| Data Rate (kbps) | | 10 | 20 | 50 | 100 |
| Channel 1 | Mean | 0 | 0.0007 | 0.0126 | 0.0501 |
| | Std | 0 | 0.001 | 0.0058 | 0.0135 |
| Channel 2 | Mean | 0 | 0.00285 | 0.0991 | 0.1589 |
| | Std | 0 | 0.0028 | 0.0208 | 0.0188 |
| Combination | Mean | 0 | 5e−05 | 0.00375 | 0.0242 |
| | Std | 0 | 0.0002 | 0.0021 | 0.0079 |

1.2 Field Test

Figure 20:
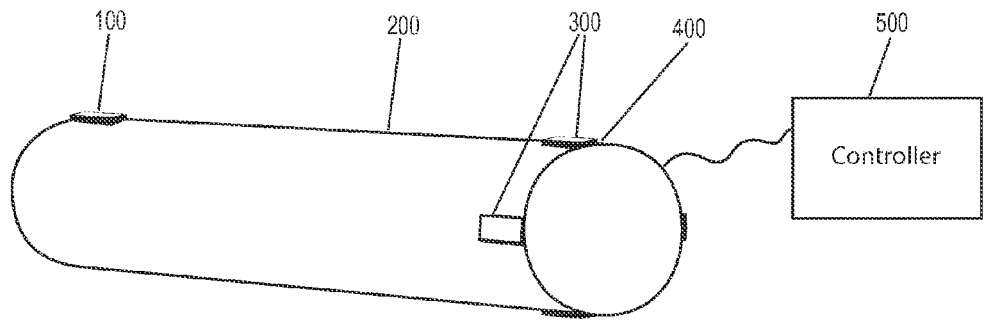
FIG. 20 depicts a schematic of 4-element transducer array setup according to the present disclosure.

We investigated the advantages of utilizing transducer arrays to further improve the transmission accuracy, and validated our technique through field tests on an in-service hot-water pipe in a real-world setting. We instrumented a segment of an in-service hot-water pipe to validate the TR communication technique in a real-world setting. The hot water piping system is located in a mechanical room at the campus of Carnegie Mellon University. That space contains mechanical components such as chillers, heat exchangers, pumps, and large-diameter pipes, with substantial mechanical and electrical noise. FIG. 20 shows the schematic of 4-element transducer array setup for time reversal PPM data communication.

The actual pipe 200 (see FIG. 20) used in the study is a Schedule 40 steel pipe with 10-inch (254 mm) inner diameter and 0.365-inch (9.04 mm) wall thickness, covered by fiberglass insulation. The pipe serves as a hot water return pipe that conveys pressurized hot water flow from the building's heat cycle back to the boiler. The heating cycle operates 24 hours a day, 7 days a week all year long. Due to the periodic pumping of hot water into the heat cycle, the hot water flow has a variable flow rate, ranging from 200 to 450 gpm, with the water temperature fluctuating from 100 to 140° F.

We removed sections of the pipe insulation to expose the pipe surface, in order to install the transducers 100, 300. The transducers 100, 300 are part of a sensor network and were used to monitor the pipes. The sensor network further includes a controller 500 capable of executing programmable instructions for monitoring the health, condition and other parameters of the pipe 200 in accordance with the present disclosure. The controller 500 also performs data communications. The transducers 100, 300 were PZT material (PSI-5A4E piezo-ceramic from Piezo System, Inc) cut into 15 mm by 15 mm wafers with thickness of 0.508 mm. Each transducer 100, 300 was first attached to a piece of copper foil and then mounted on the surface of the pipe 200 by epoxy (J-B Weld 8265-S Cold Weld). The transducers 300 were connected to a National Instrument (NI) PXI chassis for data collection. We used an NI 5421 Arbitrary Waveform Generator to excite a transmitting PZT 100, and two 2-channel NI 5122 Digitizer to record signals from four receiving PZTs 300 of the transducer receiver array 400. The wave generator and the digitizer were synchronized. The distance between the transmitter 100 and the receiver array 400 was 10 ft (3.048 m).

Figure 21:
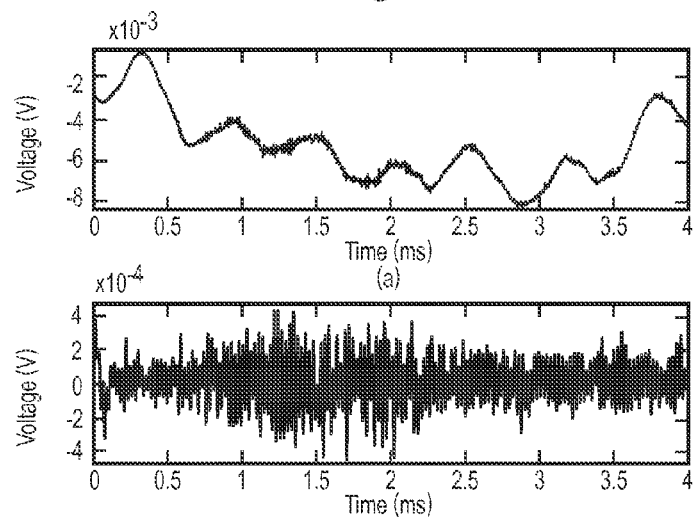
FIG. 21 depicts the snapshots of the experimentally obtained channel sounding responses (a) before and (b) after applying a 150 kHz-350 kHz band pass filter.

FIG. 21 shows a typical received ultrasonic signal in the field tests. The signal is greatly contaminated by large low-frequency noise due to mechanical vibrations that are removed using a band-pass filter. We observe a multi-modal, complex wave pattern, with much lower SNR than that of the laboratory experiments. We transmitted a stream of 1000 randomly generated bits at 10 kbps, 20 kbps, 50 kbps, and 100 kbps, and repeated the tests for multiple trials. The test parameters are shown below in Table 3.

TABLE 3

Test Parameters for TR-PPM Communications:

| Data Rate (kbps) | Frame Time (μs) | # of Bits Transmitted | Sampling Frequency (MHz) | Center Frequency (kHz) | Bandwidth (kHz) | Time Shift (μs) | # of Trials |
|---|---|---|---|---|---|---|---|
| 10 | 100 | 1000 | 2 | 250 | 500 | 25 | 20 |
| 20 | 50 | 1000 | 2 | 250 | 500 | 12.5 | 20 |
| 50 | 20 | 1000 | 2 | 250 | 500 | 5 | 20 |
| 100 | 10 | 1000 | 2 | 250 | 500 | 5 | 20 |

Figure 22:
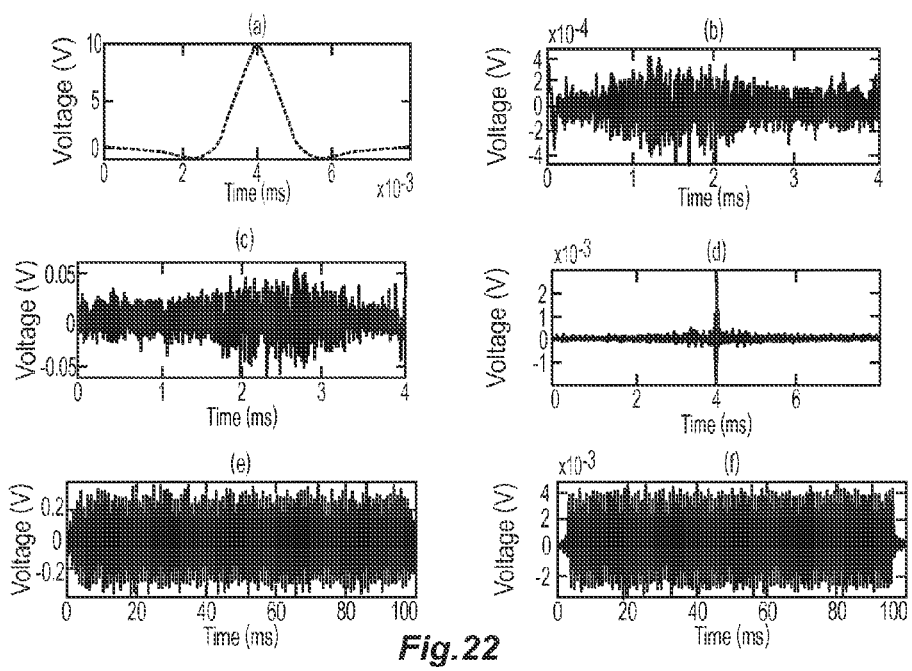
FIG. 22 depicts the snapshots of the waveforms obtained experimentally from the time reversal based communications on a pipe specimen filled with hot water at a data rate of 10 kbps. (a) Gaussian pilot signal, (b) received response after channel sounding, (c) time reversal transmission, (d) received time reversal focused waveform, and (e) modulated time reversal PPM waveform. A 150 kHz-350 kHz band pass filter was applied during data acquisition.

FIG. 22 presents the three steps of the TR communications for a 4-element transducer array configuration. FIGS. 22 (a) and (b) show that the transmission of a short 8 μs Gaussian pulse yields a long series of arrivals at the receiving end as a result of multi-modal and dispersive guided waves in a cylindrical shell. The ultrasonic waves can propagate long distance in solid media. However, the complex waveform makes it very difficult to achieve data communications using traditional techniques. FIGS. 22 (c) and (d) show that by transmitting a time-reversed response a much simpler waveform with a strong peak that occurs at the center is observed. Time reversal signal processing effectively focuses the multiple dispersive wave modes and enhances the signal to noise ratio (the y-axis scales vary in different plots).

FIGS. 22 (e) and (f) show the time reversal communication step, with a modulated time reversal PPM waveform as transmission. The transmission waveform is a superposition of 1000 time reversed waveforms (see FIG. 22 (c)) with certain time shift. The PPM waveform is scaled to avoid saturation of the wave generator. The received information carrying waveform consists of a series of focused peaks whose positions within a frame indicate a bit stream. A 150 kHz-350 k Hz band pass filter was applied during data acquisition, to remove low frequency vibrations and high frequency electrical noise. The filtering also prevented saturation of the PPM waveform due to DC drift.

Figure 23:
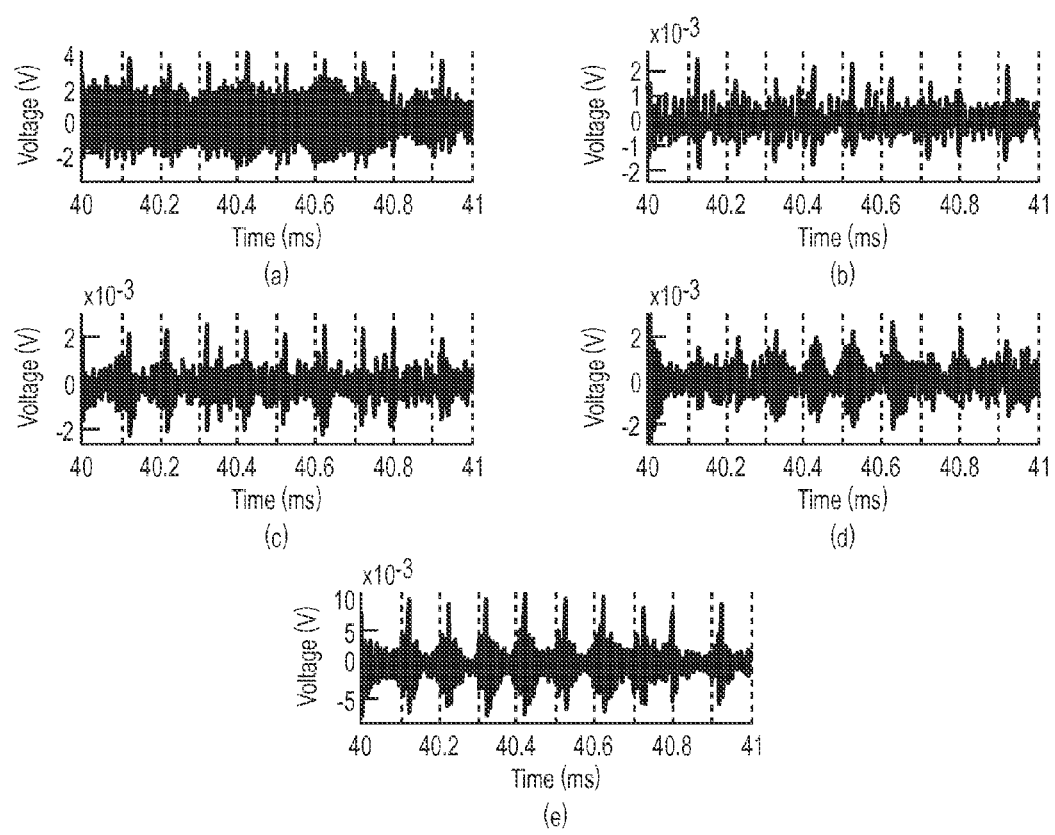
FIG. 23 depicts the snapshots of the waveforms obtained experimentally from the time reversal based communications on a pipe specimen filled with hot water at a data rate of 10 kbps. The zoomed-in snapshots of the received information carrying waveforms are obtained from (a) channel 1, (b) channel 2, (c) channel 3, (d) channel 4, and (e) the superposition of the four channels. The dash lines indicate the starting positions of symbol frames.

FIG. 23 shows the snapshots of the zoomed-in views of the received information carrying waveforms from the four PZT receivers, and the superposition of the four waveforms. The bits transmitted at 10 kbps are recognizable from the information waveform from each individual channel. However, the time reversal peaks at some data frames are not very prominent, due to the substantial noise produced by the operational variations and by the overlapped side bands of the time reversal waveforms in the continuous data frames. Superposing the waveforms from the four channels increases the time reversal peak levels while suppressing a large amount of undesirable noise. Consequently, we observe clearer peaks in the data frames indicating the bit stream. The 40-41 ms time history shown in FIG. 23 (e) is demodulated as [0, 1, 1, 1, 1, 1, 1, 1, 0, 1] by using a peak detector.

Figure 24:
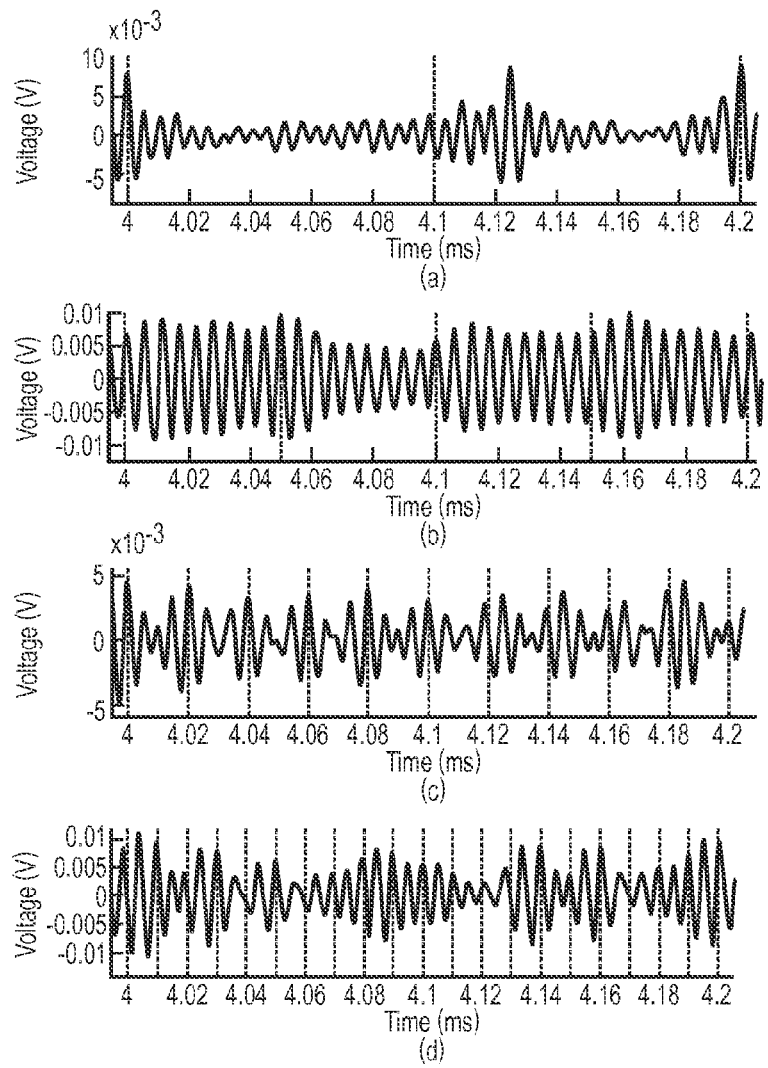
FIG. 24 depicts the snapshots of the combined received information carrying waveforms on a stainless steel pipe specimen without being filled with water using a 4-element transducer array at the data rate of (a) 10 kbps, (b) 20 kbps, (c) 50 kbps, and (d) 100 kbps, respectively.

FIG. 24 depicts the combined information carrying waveforms obtained at 10 kbps, 20 kbps, 50 kbps, and 100 kbps on a stainless steel pipe without water. It is evident that increasing the data rate leads to more overlaps of the side bands of the time reversal waveforms, and therefore, the bit stream becomes more difficult to demodulate.

Figure 25:
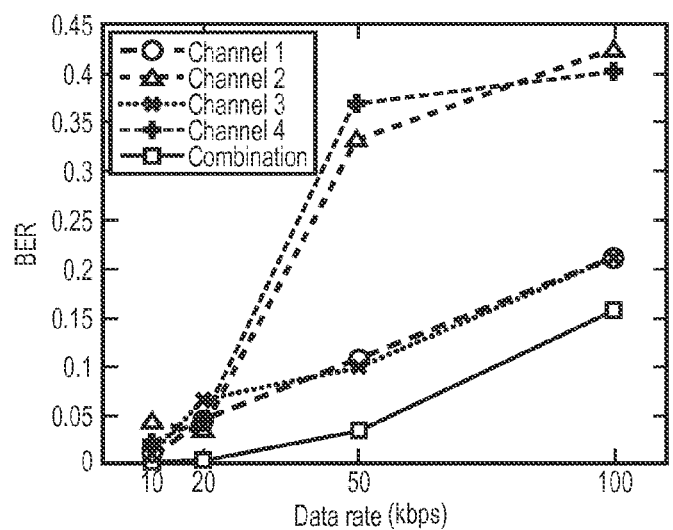
FIG. 25 depicts the experimentally obtained bit error rates for 4 individual channels and the combined channel using a 4-element transducer array versus data rate at 10 kbps, 20 kbps, 50 kbps, and 100 kbps.

We apply a peak detector to demodulate bit steams in 20 trials for each transmission data rate, and plot the average BER in FIG. 25. The figure shows that we receive higher BER as the data rate is increased. Moreover, the four receivers present different communication performance, as a result of different transmitter-receiver relative positions on the pipe, and possibly different transducer bounding conditions. The combination of the four channels achieves the best result, almost zero error at data rate blow 20 kbps, and around 0.15 error rate even at 100 kbps. See TABLE 4.0 which illustrates "Test Performance for Four Channels".

TABLE 4.0

Test Performance for Four Channels

| Data Rate (kbps) | | 10 | 20 | 50 | 100 |
|---|---|---|---|---|---|
| Channel 1 | Mean | 0.00605 | 0.0437 | 0.1047 | 0.2081 |
|  | Std | 0.0119 | 0.02029 | 0.03698 | 0.04061 |
| Channel 2 | Mean | 0.04205 | 0.0321 | 0.3296 | 0.4201 |
|  | Std | 0.03813 | 0.01962 | 0.03322 | 0.02139 |
| Channel 3 | Mean | 0.0083 | 0.0655 | 0.09785 | 0.21005 |
|  | Std | 0.01874 | 0.01803 | 0.03316 | 0.0223 |
| Channel 4 | Mean | 0.0222 | 0.0448 | 0.36815 | 0.3984 |
|  | Std | 0.03496 | 0.01039 | 0.06307 | 0.0429 |
| Combination | Mean | 0 | 0.0002 | 0.0306 | 0.153 |
|  | Std | 0 | 6.7823e-4 | 0.02577 | 0.02829 |

2. Conclusion

Part III demonstrates the use of sensor arrays can further improve the data communication performance using the proposed time reveal scheme. The encouraging results show that the TR communication technique is robust to dynamic, large, and complex environmental and operational variations. The field tests demonstrate the feasibility and reliability of deploying our TR communication techniques for real-world applications.

PART IV

Experimental Data on Time Reversal PPM Data Communications on Carbon Steel Pipes and Stainless Steel Pipes 1. Carbon Steel Pipe The objective of the experiment was to investigate the reliability of our technique by sending a relatively long stream of bits at different data rates, and the feasibility of (real-time) automatic decoding of the bit streams. The first set of experiments were performed on a carbon steel pipe specimen, 1.8 mm in length, 70 mm in outside diameter and 4 mm in wall thickness. Two PZT wafers (PSI-5A4E, Piezo Systems, Inc., Cambridge, Mass.) were mounted on the surface of the pipe using cyanoacrylate adhesive, located 1.5 m apart similar to the illustration of FIG. 15. Each wafer was 12 mm long and 6 mm wide.

Figure 26:
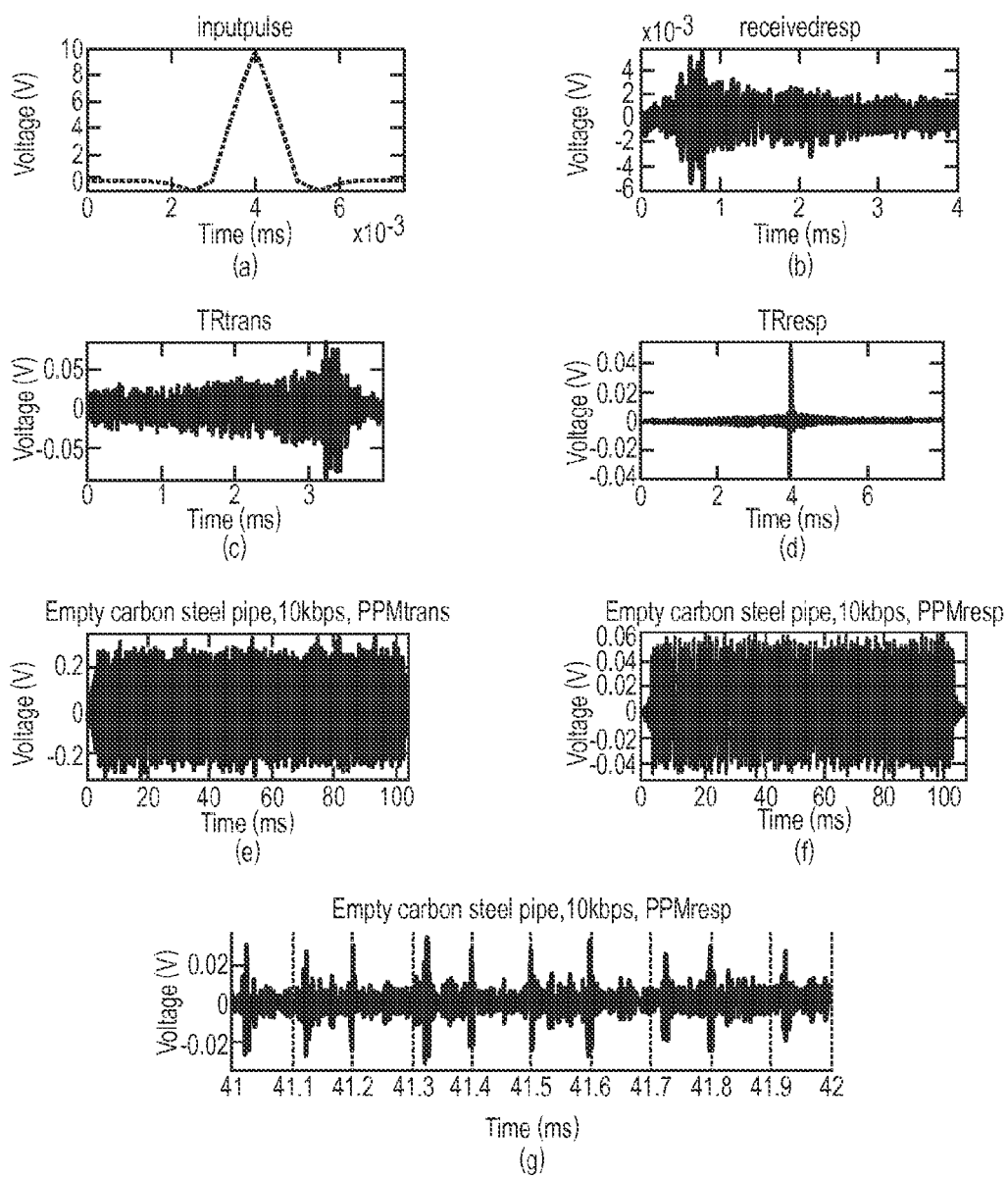
FIG. 26 depicts the snapshots of the waveforms obtained experimentally from the time reversal based communications at a data rate of 10 kbps. (a) Gaussian pilot signal, (b) received response after channel sounding, (c) time reversal transmission, (d) received time reversal focused waveform, (e) modulated time reversal PPM waveform, (f) received information carrying waveforms, and (g) zoomed-in plot of (f). The dash lines indicate the starting positions of symbol frames.

The testing scenario included sending bit streams at 10 kbps, 20 kbps, 50 kbps, and 100 kbps though an empty pipe. TABLE 4.1 shows the test parameters for TR-PPM communications for this testing scenario and FIG. 26 shows the results of the test.

TABLE 4.1

Test Parameters for TR-PPM Communications:

| Data Rate (kbps) | Frame Time (μs) | # of Bits Trans-mitted | Sampling Frequency (MHz) | Center Fre-quency (kHz) | Band-width (kHz) | Time Shift (μs) | # of Trials |
|---|---|---|---|---|---|---|---|
| 10 | 100 | 1000 | 2 | 250 | 500 | 25 | 40 |
| 20 | 50 | 1000 | 2 | 250 | 500 | 12.5 | 40 |
| 50 | 20 | 1000 | 2 | 250 | 500 | 5 | 40 |
| 100 | 10 | 1000 | 2 | 250 | 500 | 2.5 | 40 |

FIGS. 26 (a) and (b) show that transmitting a short 8 μs Gaussian pulse yields a long series of arrivals at the receiving end, as a result of multi-modal and dispersive guided waves in a cylindrical shell. The ultrasonic waves can propagate long distance in solid media. However, the complex waveform makes it very difficult to achieve data communications using traditional techniques.

FIGS. 26(c) and (d) show that transmitting a time-reversed response yields a much simpler waveform with a strong peak at the center. Time reversal signal processing effectively focuses the multiple dispersive wave modes and enhances the signal to noise ratio.

FIGS. 26(e) and (f) show the time reversal communication step, with a modulated time reversal PPM waveform being the transmission signal. The transmission waveform is a superposition of 1000 time reversed waveforms (FIG. 26(c)) with certain time shift. The PPM waveform is scaled to avoid saturation of the wave generator. The received information carrying waveform consists of a series of focused peaks whose positions within a frame indicate bit stream.

A 5 kHz-600 kHz band-pass filter was applied during data acquisition, to remove low frequency vibrations and high frequency electrical noise. The filtering also prevented saturation of the PPM waveform due to DC drift.

FIG. 26(g) depicts the zoomed-in view of FIG. 26(f) in the 41 ms-42 ms time window when 10-bit information is decoded as [1 1 0 1 0 0 0 1 0 1].

Figure 27:
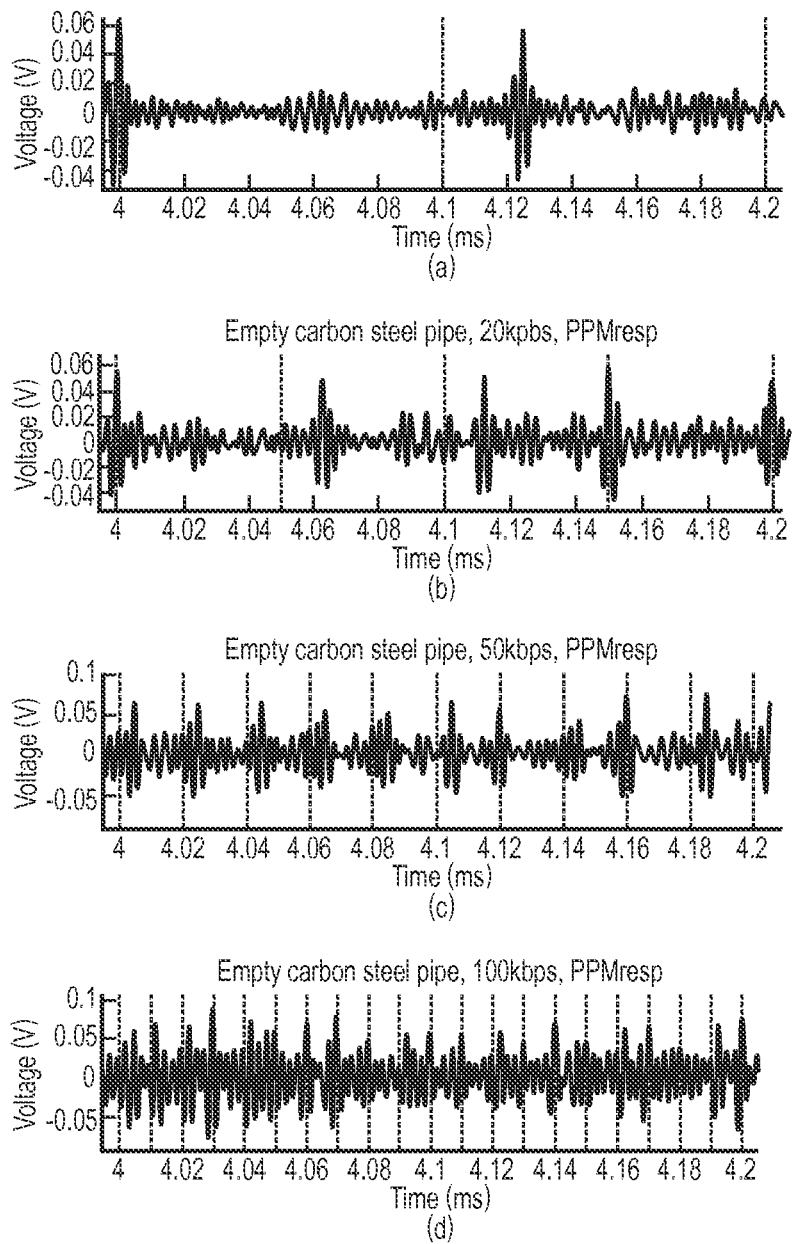
FIG. 27 depicts the snapshots of the received information carrying waveforms obtained experimentally in the 4.0 ms-4.2 ms time window at a data rate of (a) 10 kbps, (b) 20 kbps, (c) 50 kbps, and (d) 100 kbps.

FIG. 27 shows the time reversal communication results at different data rates with a zoomed-in view of waveforms in the 4.0 ms-4.2 ms time window. The peaks are more clearly separated at lower data rates. Shorter frame time leads to superposing more sidebands of multiple time reversal focused waveforms, and therefore the focused peaks become less distinguishable.

Figure 28:
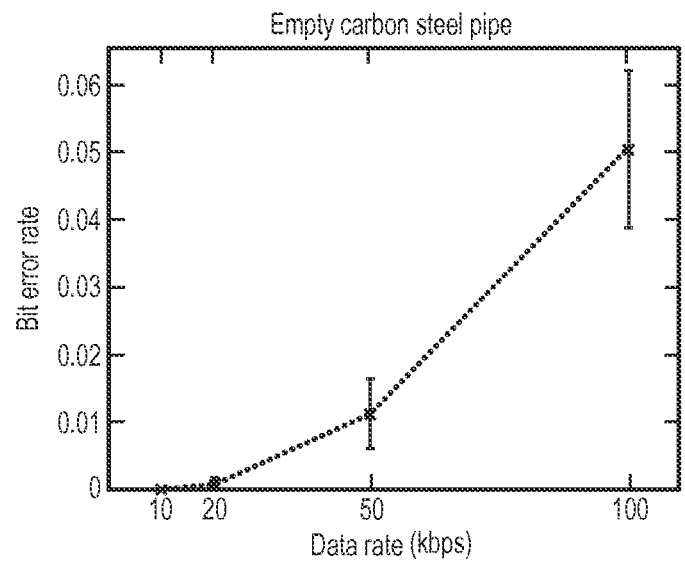
FIG. 28 depicts the average bit error rate obtained experimentally at the data rate of 10 kbps, 20 kbps, 50 kbps, and 100 kbps.

The data bit in a frame is demodulated by identifying the location of the largest peak within that frame. FIG. 28 and Table 5 provide the bit error rate (BER) obtained at the data rate of 10 kbps, 20 kbps, 50 kbps, and 100 kbps, by averaging over 40 independent trial runs for each scenario. For each trial run, the information stream consists of 1000 randomly generated bits. A different bit stream is generated independently for transmission at each trial run.

TABLE 5

Bit Error Rate Performance

| Data Rate (kbps) | 10 | 20 | 50 | 100 |
|---|---|---|---|---|
| Mean | 0 | 5.75e−4 | 1.095e−2 | 5.005e−2 |
| Standard deviation | 0 | 8.3329e−4 | 5.1573e−3 | 1.1777e−2 |

Figure 29:
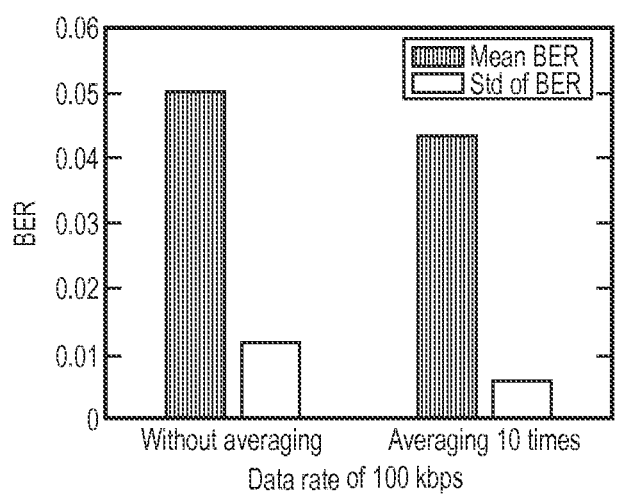
FIG. 29 depicts the calculated mean and the standard deviation of the bit error rates over multiple trials using time averaging. The results show that time averaging of the received signals could reduce noise and thus reducing the bit error rate.

We studied the effect of noise level in the data acquisition system on the communication BER. We averaged the received responses 10 times to reduce the power level of white noise, and compared the results from data acquisition that do not employ averaging. FIG. 29 shows that the mean and the standard deviation of BER over multiple trials drop down to 4.325e-2 and 5.5524e-3, respectively, as compared to 5.005e-2 and 1.1777e-2, respectively, which implies that the white noise is not suppressed by averaging in this case. The improvement is not significant, because the increment in the signal to noise ratio by averaging is insignificant compared to that by applying time reversal focusing technique.

2. Stainless Steel Pipe

The objective was to validate that our technique can be generalized to 1) pipes of different materials, dimensions, and contents, 2) sensors of different sizes and distances, and 3) different noise levels. The experiments were conducted on a stainless steel pipe, 1.5 mm in length, 115 mm in outside diameter and 6 mm in wall thickness. Two PZT wafers (PSI-5A4E) were mounted on the surface of the pipe using cyanoacrylate adhesive, located 0.69 m apart similar to the illustration of FIG. 15. Each wafer was 10 mm long and 10 mm wide. The testing scenarios included sending bit streams at 10 kbps, 20 kbps, 50 kbps and 100 kbps through a pipe filled with and without water; sending bit streams at 10 kbps through a pipe with and without averaging (10 times) received responses.

Figure 30:
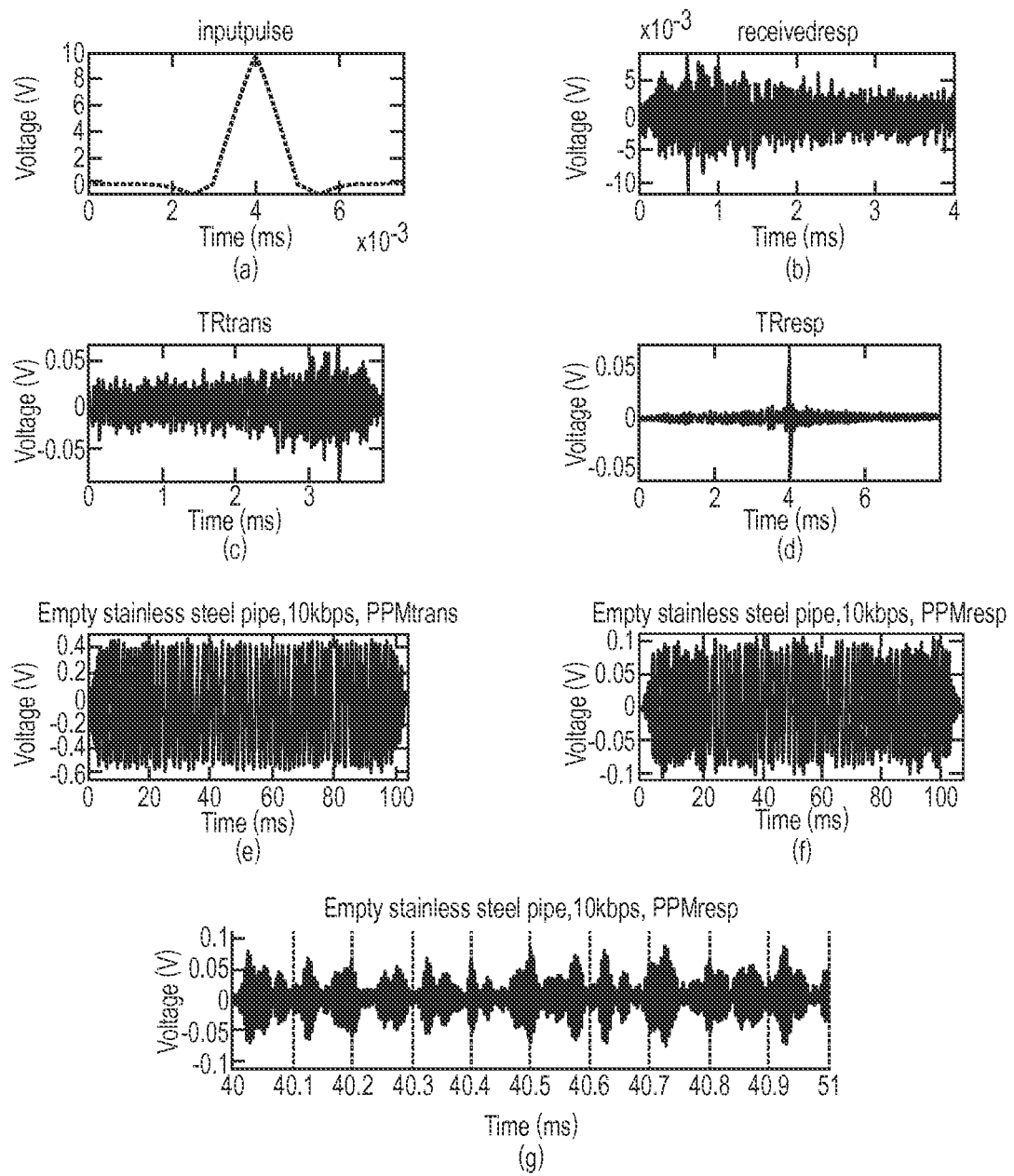
FIG. 30 depicts the snapshots of the waveforms obtained experimentally from the time reversal based communications on a stainless steel pipe specimen that is not filled with water at a data rate of 10 kbps. (a) Gaussian pilot signal, (b) received response after channel sounding, (c) time reversal transmission, (d) received time reversal focused waveform, (e) modulated time reversal PPM waveform, (f) received information carrying waveforms, and (g) zoomed-in plot of (f). The red dash lines indicate the starting positions of symbol frames.
Figure 31:
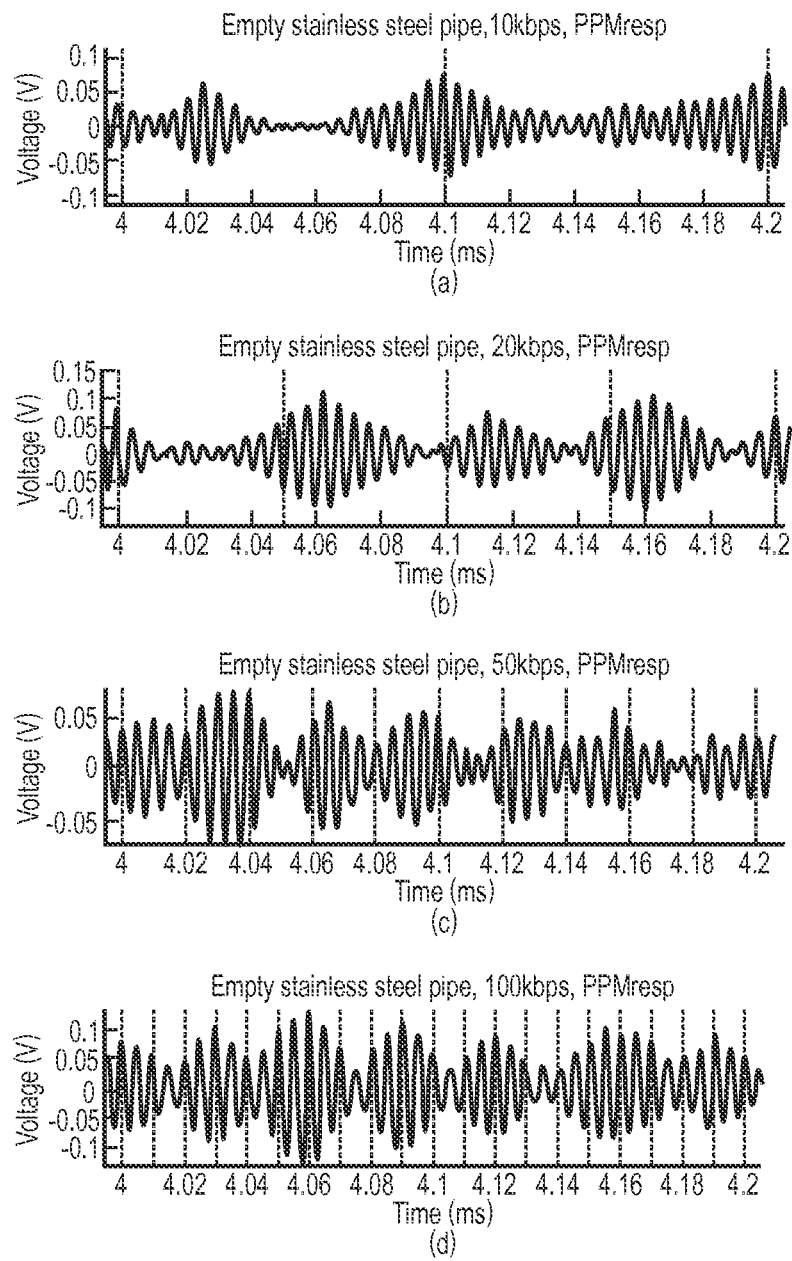
FIG. 31 depicts the snapshots of the received information carrying waveforms obtained experimentally from the time reversal based communications on a stainless steel pipe specimen that is not filled with water in that 4.0 ms-4.2 ms time window. The data rates are (a) 10 kbps, (b) 20 kbps, (c) 50 kbps, and (d) 100 kbps.
Figure 32:
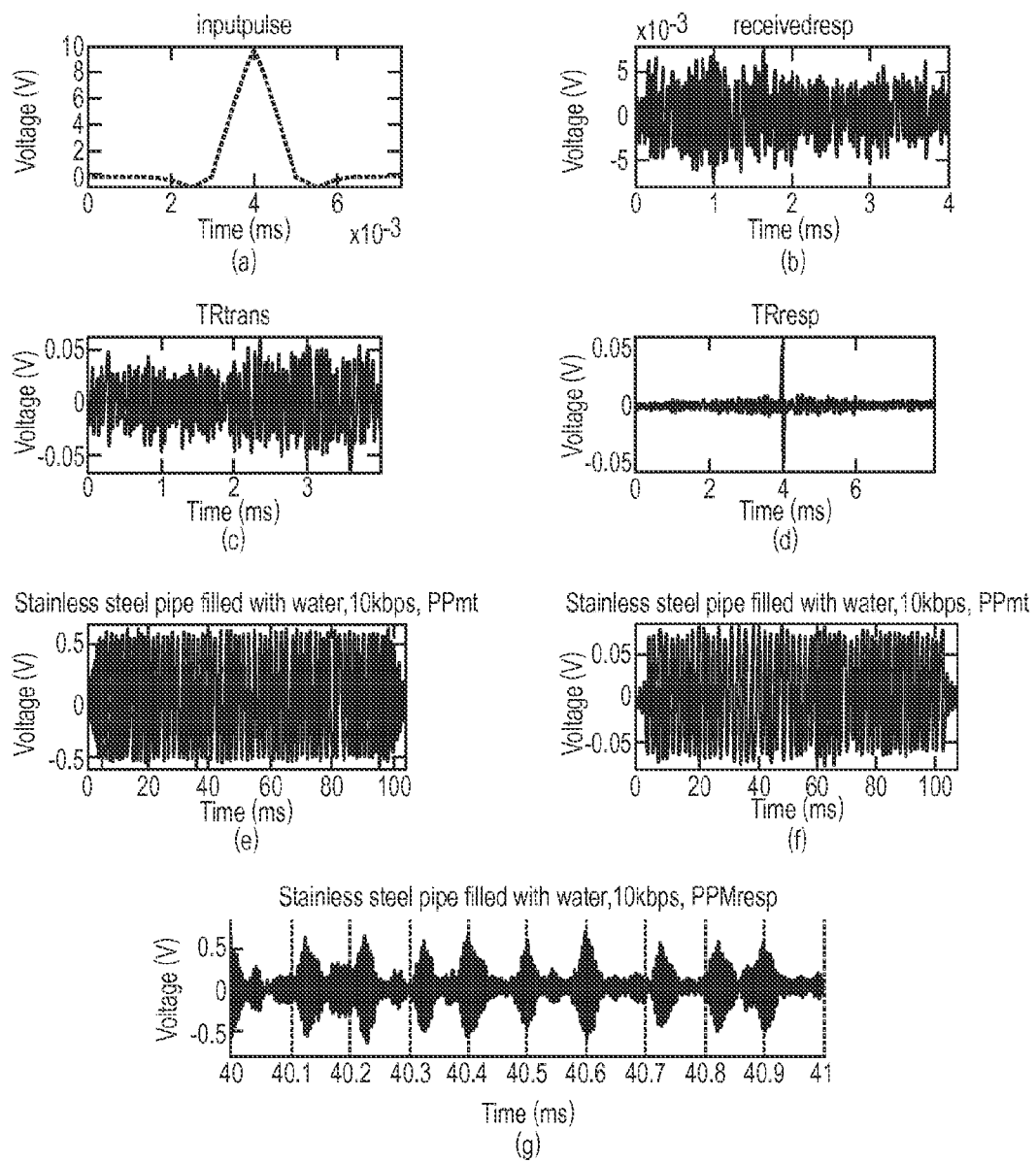
FIG. 32 depicts the snapshots of the waveforms obtained experimentally from the time reversal based communications on a stainless steel pipe specimen filled with water at a data rate of 10 kbps. (a) Gaussian pilot signal, (b) received response after channel sounding, (c) time reversal transmission, (d) received time reversal focused waveform, (e) modulated time reversal PPM waveform, (f) received information carrying waveforms, and (g) zoomed-in plot of (f). The red dash lines indicate the starting positions of symbol frames.
Figure 33:
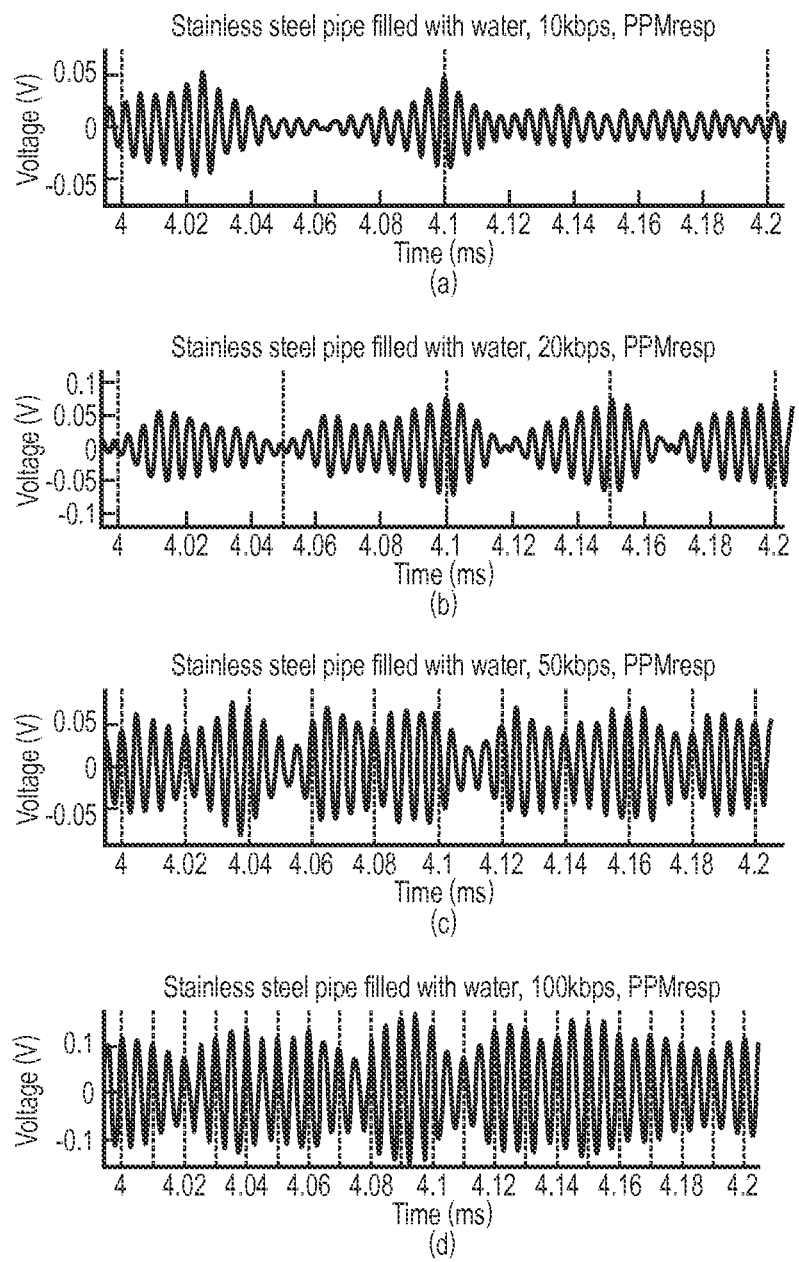
FIG. 33 depicts the snapshots of the received information carrying waveforms in the 4.0 ms-4.2 ms time window obtained experimentally on a stainless steel pipe specimen filled with water at the data rates of (a) 10 kbps, (b) 20 kbps, (c) 50 kbps, and (d) 100 kbps.

The stainless steel pipe vertically stood on the floor, with the bottom end sealed with a rubber cap to allow the pipe to hold water. A few drops of detergent liquid were added to the water, to release bubbles at the pipe-water interface. Similar to the experiments on the carbon steel pipe, the three-step TR communication experiments were performed on the stainless steel pipe without water (see FIG. 30 and FIG. 31) and with water (see FIG. 32 and FIG. 33).

Similar to the experimental results on the carbon steel pipe, we observed a complex channel sounding response on the stainless steel pipe, and a large time reversal focused peak. However, we also noticed more strength on the side bands of the central time reversal focused peak in the time domain waveform. That is caused by the relatively small ratio of the transmitter/receiver distance and the pipe diameter (i.e., 6), whereas the ratio is about 21 for configuration of the carbon steel pipe experiment. As a result, the receiver at a single point on the pipe did not capture as many wave modes excited by the transmitter. Consequently, the information carrying waveform is more contaminated by the side bands of the time reversal signal.

Increasing the data rate leads to more overlaps of the side bands of the time reversal waveforms, and therefore, the bit stream becomes more difficult to demodulate. We repeated the same experimental procedure on the water filled stainless steel pipe, and obtained similar results (see FIGS. 32 and 33). We observed that the information carrying waveform is less interfered by the side bands of the time reversal response. The bit stream turns out to be more distinguishable when the pipe is filled with water. The interpretation is that water suppresses certain guided wave modes in the pipe (such as flexural modes), and therefore a short transducer distance has a less adverse effect on time reversal focusing.

Figure 34:
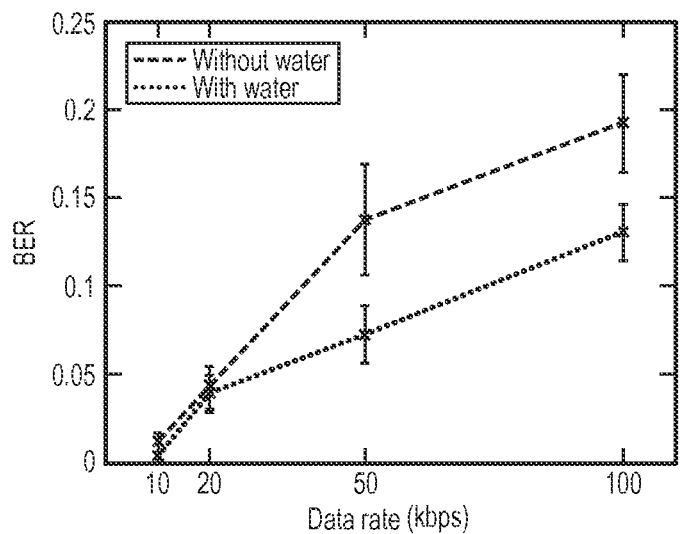
FIG. 34 depicts the calculated bit error rates at the data rate of 10 kbps, 20 kbps, 50 kbps, and 100 kbps for two experimental scenarios: a pipe specimen filled with water and the same pipe specimen that is not filled with water.

As a result, we achieved a lower BER for the TR communications on the water filled pipe, at the data rate of 10 kbps, 20 kbps, 50 kbps, and 100 kbps (see FIG. 34 and Table 6).

TABLE 6

Bit Error Rate (BER) Performance

| Data Rate (kbps) | | 10 | 20 | 50 | 100 |
|---|---|---|---|---|---|
| Without water | Mean | 1.195e−2 | 4.2025e−2 | 0.13735 | 0.19095 |
| | Std | 4.7167e−3 | 1.2439e−2 | 3.1035e−2 | 2.7716e−2 |
| With water | Mean | 2.925e−3 | 3.8875e−2 | 7.2125e−2 | 0.1295 |
| | Std | 3.4087e−3 | 1.0785e−2 | 1.5651e−2 | 1.5652e−2 |

Figure 35:
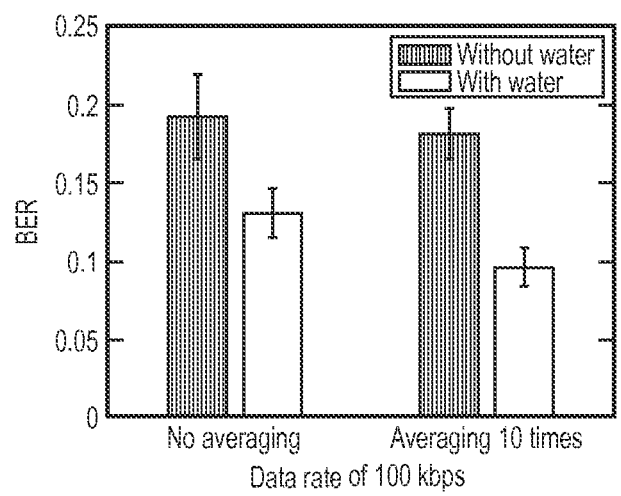
FIG. 35 depicts the impact of averaging on the bit error rate for the two experimental scenarios: a pipe specimen filled with water and the same pipe specimen that is not filled with water.

Averaging the received responses by 10 times improves the communication accuracy for both scenarios (with and without water), but the improvement is not significant, as shown in Table 7 and depicted in FIG. 35.

TABLE 7

Impact of Averaging, on Bit Error Rate (BER)

| Data Rate (kbps) | | No averaging | Averaging 10 times |
|---|---|---|---|
| Without water | Mean | 0.19095 | 0.18115 |
| | Std | 2.7716e−2 | 1.501e−2 |
| With water | Mean | 0.1295 | 0.095 |
| | Std | 1.5652e−2 | 1.22e−2 |

Figure 15:
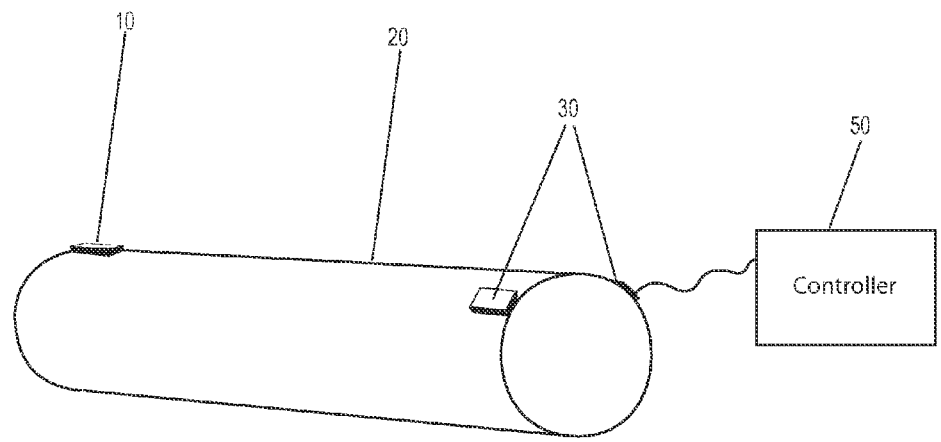
FIG. 15 depicts a schematic of 2-element transducer array experimental setup according to the present disclosure.
Figure 36A:
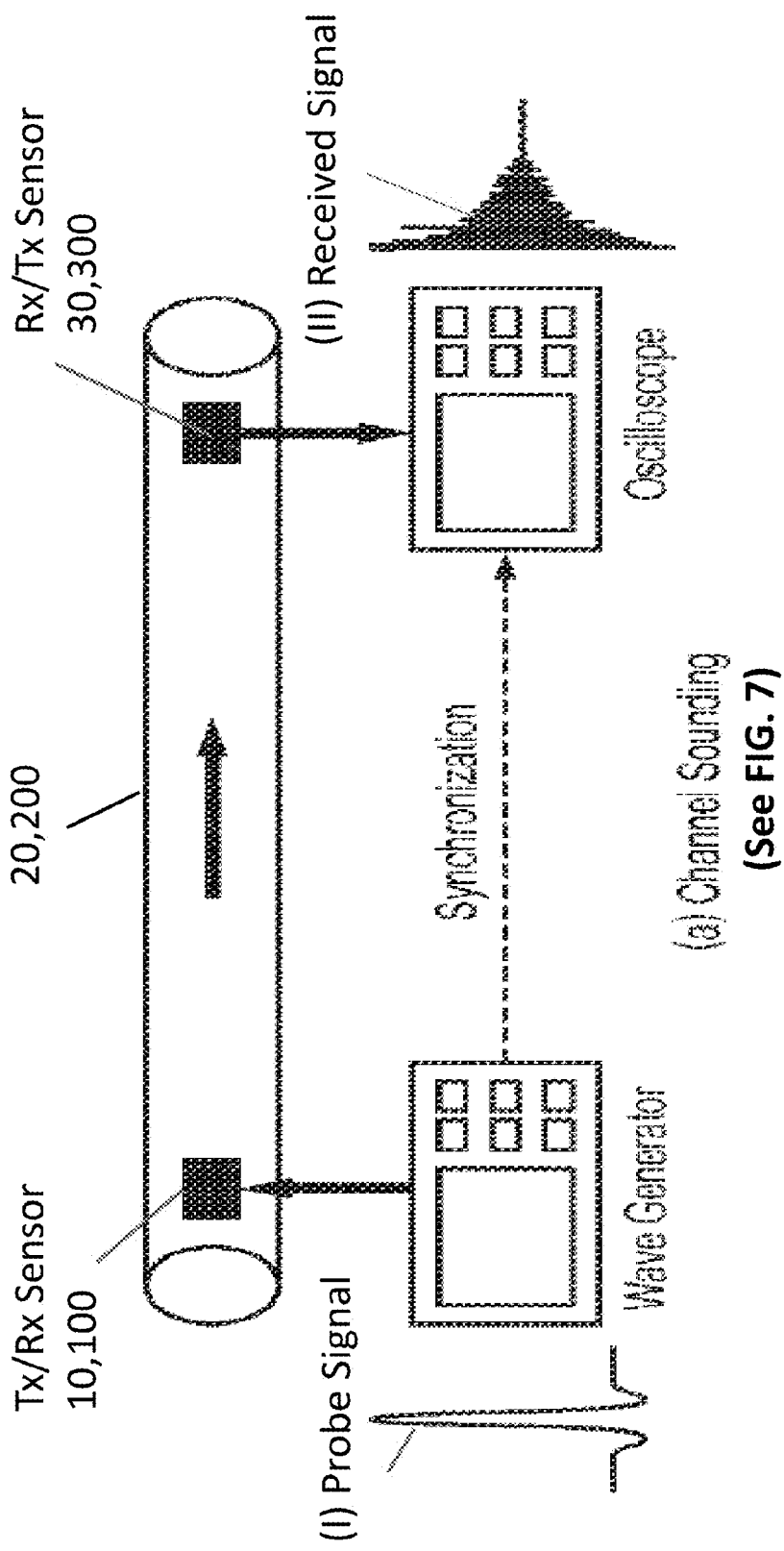
FIG. 36A is a schematic consolidation of FIG. 2.

To summarize the embodiments of the present disclosure, FIG. 36A is a schematic consolidation of FIG. 2; FIG. 7 Item (a) Channel Sounding; FIG. 15; and FIG. 20. More particularly, FIG. 36A illustrates the time reversal pulse position modulation (TR-PPM) enabled data communication over a dispersive multi-modal elastic channel, e.g., steel pipes 20 or 200 of FIG. 15 or 20, respectively, as described above with respect to FIGS. 2 and 7 according to embodiments of the present disclosure. Signal (I) is a plot of the pilot or probe signal that is sent during Step 1-Channel Sounding (FIG. 7(a)) from Rx/Tx Sensor 30 or 300 (destination sensor B) through the pipe 20, 200 to Tx/Rx sensor 10, 100 (source sensor A) for probing the dispersive channel 20, 200. Signal (II) is a plot of the received pilot or probe signal, which is time spread. As described above with respect to FIG. 2, Step 1—Channel Sounding, at least one Tx/Rx Sensor 10 or 100 and at least one Rx/Tx Sensor 30 or 300 are capable of both transmitting and receiving a signal.

Figure 36B:
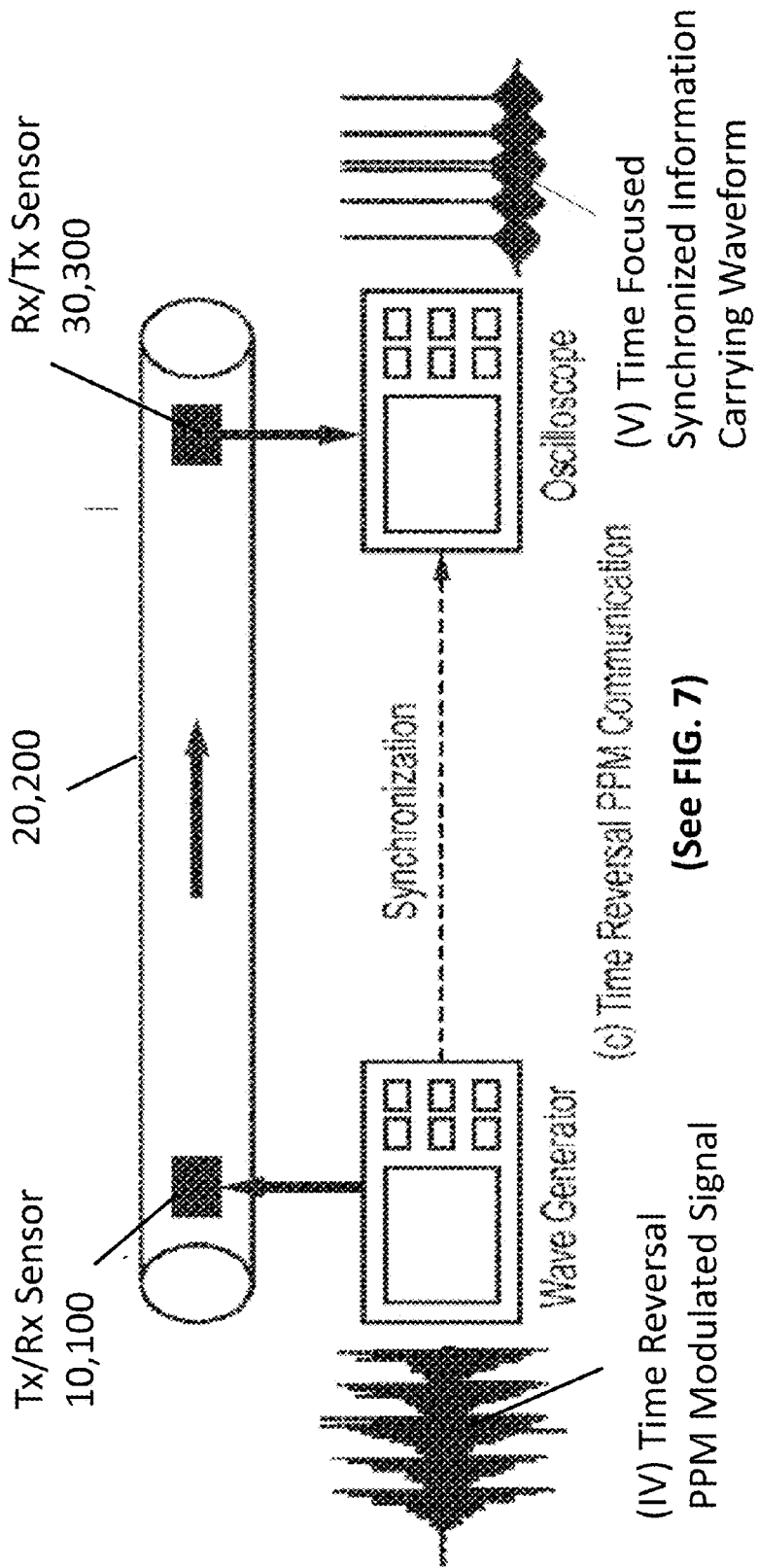
FIG. 36B is a schematic consolidation of FIG. 2.

FIG. 36B is a schematic consolidation of FIG. 2; FIG. 7 Item (c) Time Reversal PPM Communication; FIG. 15; and FIG. 20 and illustrates Step 3-Time Reversal PPM Communication (FIG. 7(c)) wherein Signal (IV) is a plot of the time reversal PPM modulated signal applied to the received signal for information bit transmission and Signal (V) is a plot that represents the synchronized received signal detected and demodulated for information retrieval as a time focused synchronized information carrying waveform.

Although the present disclosure has been described in considerable detail with reference to certain embodiments, other embodiments and versions are possible and contemplated. Therefore, the spirit and scope of the appended claims should not be limited to the description of the preferred embodiments contained therein.

The invention claimed is:

1. A data communications method comprising:
    in a dispersive multi-modal elastic channel that includes a plurality of sensors, at least two of the sensors capable of both transmitting and receiving a signal,
    probing the dispersive multi-modal elastic channel by transmitting a pilot elastic signal through the dispersive multi-modal elastic channel from at least one sensor capable of both transmitting and receiving a signal and configured and disposed as a destination sensor to at least another sensor capable of both transmitting and receiving a signal and configured and disposed as a source sensor;
    receiving the pilot elastic signal at the at least another sensor capable of both transmitting and receiving a signal and configured and disposed as a source sensor, and time reversing the received pilot elastic signal;
    modulating the time reversed elastic signal by pulse position modulation using a training preamble symbol to generate a time reversed pulse position modulated elastic preamble signal normalized by an energy normalization coefficient;
    modulating the time reversed elastic signal by pulse position modulation using an information carrying symbol to form a time reversed pulse position modulated elastic information carrying signal normalized by the energy normalization coefficient; and
    transmitting from the at least another sensor capable of both transmitting and receiving a signal and configured and disposed as a source sensor a total waveform that includes the normalized time reversed pulse position modulated elastic preamble signal followed by the normalized time reversed pulse position modulated information carrying signal to the at least one sensor capable of both transmitting and receiving a signal and configured and disposed as a destination sensor.

2. The data communications method in claim 1, further comprising:
    at the at least one sensor capable of both transmitting and receiving a signal and configured and disposed as a destination sensor, estimating a start time of the training preamble symbol using the received normalized time reversed pulse position modulated elastic preamble signal and the plot elastic signal; and
    demodulating the received normalized time reversed pulse position modulated elastic information carrying signal using the estimated start time of the training preamble symbol.

3. The method according to claim 1, wherein one of the normalized time reversed pulse position modulated elastic preamble signal or the normalized time reversed pulse position modulated elastic information carrying signal is or both the normalized time reversed pulse position modulated elastic preamble signal and the normalized time reversed pulse position modulated elastic information carrying signal are communication data transmitted using guided elastic waves.

4. The method according to claim 3, wherein the dispersive multi-modal elastic channel is a civil structure, wherein the civil structure is selected from the group consisting of a pipe, bridge, railway, pipe-like hollow structure, and offshore platform.

5. The method according to claim 1, further comprising providing a sensor network having a plurality of the at least two sensors capable of both transmitting and receiving a signal, and at least one controller, the plurality of the at least two sensors mounted on the dispersive multi-modal elastic channel.

6. The method according to claim 5, wherein at least one of the steps of the data communications method occurs between the at least another sensor capable of both transmitting and receiving a signal and configured and disposed as a source sensor and the sensor network or between the at least one sensor capable of both transmitting and receiving a signal and configured and disposed as a destination sensor and the sensor network, or between the sensor network and the at least one controller.

7. The method according to claim 1, wherein the time reversing of the received pilot elastic signal pre-equalizes the dispersive multi-modal elastic channel.

8. The method according to claim 1, wherein the transmitting of a total waveform that includes the normalized time reversed pulse position modulated elastic preamble signal followed by the normalized time reversed pulse position modulated information carrying signal to the destination sensor includes transmitting the normalized time reversed pulse position modulated information carrying symbol that is data relating to a structural condition of the dispersive multi-modal elastic channel.

9. The method according to claim 1, wherein elastic signal dispersion at the at least one sensor capable of both transmitting and receiving a signal and configured and disposed as a destination sensor is compensated by transmitting the total waveform via the dispersive multi-modal elastic channel.

10. The method according to claim 2, wherein the step of estimating the start time of the training preamble symbol is for performing timing acquisition.

11. The method according to claim 1, wherein the transmitting of the normalized time reversed pulse position modulated information carrying signal to the at least one sensor capable of both transmitting and receiving a signal and configured and disposed as a destination sensor occurs following a guard time after the transmitting of the normalized time reversed pulse position modulated elastic preamble signal.

12. A system for transmitting communication data comprising:
a sensor network having a plurality of sensors, at least two of the sensors capable of both transmitting and receiving a signal, configured and disposed to be mounted to a dispersive multi-modal elastic channel; and
at least one controller in operative communication with the sensor network;
the at least one controller adapted to:
probe the dispersive multi-modal elastic channel by transmitting a pilot elastic signal through the dispersive multi-modal elastic channel from at least one sensor capable of both transmitting and receiving a signal and configured and disposed as a destination sensor to at least another sensor capable of both transmitting and receiving a signal and configured and disposed as a source sensor;
receive the pilot elastic signal at the at least another sensor capable of both transmitting and receiving a signal and configured and disposed as a source sensor, and time reverse the received pilot elastic signal;
modulate the time reversed elastic signal by pulse position modulation using a training preamble symbol to generate a time reversed pulse position modulated elastic preamble signal normalized by an energy normalization coefficient;
modulate the time reversed elastic signal by pulse position modulation using an information carrying symbol to form a time reversed pulse position modulated elastic information carrying signal normalized by the energy normalization coefficient; and
transmit from the at least another sensor capable of both transmitting and receiving a signal and configured and disposed as a source sensor a total waveform that includes the normalized time reversed pulse position modulated elastic preamble signal followed by the normalized time reversed pulse position modulated information carrying signal to the at least one sensor capable of both transmitting and receiving a signal and configured and disposed as a destination sensor.

13. The system according to claim 12, wherein the dispersive multi-modal elastic channel is a civil structure.

14. The system according to claim 13, wherein the civil structure is selected from the group consisting of a pipe, bridge, railway, pipe-like hollow structure, and offshore platform.

15. The system according to claim 12, wherein the signal transmitted as a pilot elastic signal through the dispersive multi-modal elastic channel from at least one sensor capable of both transmitting and receiving a signal and configured and disposed as a destination sensor to at least another sensor capable of both transmitting and receiving a signal and configured and disposed as a source sensor is transmitted between the at least another sensor capable of both transmitting and receiving a signal and configured and disposed as a source sensor and the sensor network or between the at least one sensor capable of both transmitting and receiving a signal and configured and disposed as a destination sensor and the sensor network, or between the sensor network and the at least one controller.

16. The system according to claim 12, wherein the communication data that is transmitted includes communication data relating to a structural condition of the multi-modal dispersive elastic channel.

17. The system according to claim 16, wherein the multi-modal dispersive elastic channel is a civil structure selected from the group consisting of a pipe, and a pipe-like hollow structure.

18. The system according to claim 12, further comprising the at least one controller adapted to:
at the at least one sensor capable of both transmitting and receiving a signal and configured and disposed as a destination sensor,
estimate a start time of the training preamble symbol using the received normalized time reversed pulse position modulated elastic preamble signal and the pilot elastic signal; and
demodulate the received normalized time reversed pulse position modulated elastic information carrying signal using the estimated start time of the training preamble symbol.

19. A non-transitory computer readable storage medium storing a program which, when executed by a computer, causes the computer to perform a method for transmitting data, the method comprising:
in a dispersive multi-modal elastic channel that includes a plurality of sensors, at least two of the sensors capable of both transmitting and receiving a signal,
probing the dispersive multi-modal elastic channel by transmitting a pilot elastic signal through the dispersive multi-modal elastic channel from at least one sensor capable of both transmitting and receiving a signal and configured and disposed as a destination sensor to at least another sensor capable of both transmitting and receiving a signal and configured and disposed as a source sensor;
receiving the pilot elastic signal at the at least another sensor capable of both transmitting and receiving a signal and configured and disposed as a source sensor, and time reversing the received pilot elastic signal;
modulating the time reversed elastic signal by pulse position modulation using a training preamble symbol to generate a time reversed pulse position modulated elastic preamble signal normalized by an energy normalization coefficient;
modulating the time reversed elastic signal by pulse position modulation using an information carrying symbol to form a time reversed pulse position modulated elastic information carrying signal normalized by the energy normalization coefficient; and transmitting from the at least another sensor capable of both transmitting and receiving a signal and configured and disposed as a source sensor a total waveform that includes the normalized time reversed pulse position modulated elastic preamble signal followed by the normalized time reversed pulse position modulated information carrying signal to the at least one sensor capable of both transmitting and receiving a signal and configured and disposed as a destination sensor.

20. The non-transitory computer readable storage medium according to claim 19, wherein the normalized time reversed pulse position modulated elastic preamble signal is or the normalized time reversed pulse position modulated information carrying signal is or both the normalized time reversed pulse position modulated elastic preamble signal and the normalized time reversed pulse position modulated information carrying signal are communication data transmitted via a civil structure, and wherein the civil structure is selected from the group consisting of a pipe, bridge, railway, pipe-like hollow structure, and offshore platform.

21. The non-transitory computer readable storage medium according to claim 20, wherein the communication data that is transmitted includes communication data relating to a structural condition of the civil structure.

22. The non-transitory computer readable storage medium according to claim 20, wherein the normalized time reversed pulse position modulated elastic preamble signal or the normalized time reversed pulse position modulated elastic information carrying signal or both the normalized time reversed pulse position modulated elastic preamble signal and the normalized time reversed pulse position modulated elastic information carrying signal take the form of $$s(t) = \sum_{i=0}^{M-1} ky(-t)\delta(t - iT_f - c_j\Delta).$$

23. The non-transitory computer readable storage medium according to claim 19, wherein the normalized time reversed pulse position modulated elastic preamble signal is or the normalized time reversed use position modulated information carrying signal is or both the normalized time reversed pulse position modulated elastic preamble signal and the normalized time reversed pulse position modulated information carrying signal are binary data.

24. The non-transitory computer readable storage medium according to claim 19, the method further comprising:
at the at least one sensor capable of both transmitting and receiving a signal and configured and disposed as a destination sensor, estimating a start time of the training preamble symbol using the received normalized time reversed pulse position modulated elastic preamble signal and the pilot elastic signal; and
demodulating the received normalized time reversed pulse position modulated elastic information carrying signal using the start time of the training preamble symbol.

25. A timing acquisition and synchronization method for demodulation, the method comprising:
in a dispersive multi-modal elastic channel that includes a plurality of sensors, at least two of the sensors capable of both transmitting and receiving a signal, probing the dispersive multi-modal elastic channel by transmitting a pilot elastic signal through the dispersive multi-modal elastic channel from at least one sensor capable of both transmitting and receiving a signal and configured and disposed as a destination sensor to at least another sensor capable of both transmitting and receiving a signal and configured and disposed as a source sensor;
receiving the pilot elastic signal at the at least another sensor capable of both transmitting and receiving a signal and configured and disposed as a source sensor, and time reversing the received pilot elastic signal;
modulating the time reversed elastic signal by pulse position modulation using a training preamble symbol to generate a time reversed pulse position modulated elastic preamble signal normalized by an energy normalization coefficient;
modulating the time reversed elastic signal by pulse position modulation using an information carrying symbol to form a time reversed pulse position modulated elastic information carrying signal normalized by the energy normalization coefficient;
transmitting from the at least another sensor capable of both transmitting and receiving a signal and configured and disposed as a source sensor a total waveform that includes the normalized time reversed pulse position modulated elastic preamble signal followed by the normalized time reversed pulse position modulated information carrying signal to the at least one sensor capable of both transmitting and receiving a signal and configured and disposed as a destination sensor; and
at the at least one sensor capable of both transmitting and receiving a signal and configured and disposed as a destination sensor,
estimating a start time of the training preamble symbol using the received normalized time reversed pulse position modulated elastic preamble signal and the pilot elastic signal.

26. The method according to claim 25,
further comprising demodulating the received normalized time reversed pulse position modulated elastic information carrying signal using the start time of the training preamble symbol.

27. The method according to claim 26,
wherein one of the normalized time reversed pulse position modulated elastic preamble signal or the normalized time reversed pulse position modulated elastic information carrying signal is or both the normalized time reversed pulse position modulated elastic preamble signal and the normalized time reversed pulse position modulated elastic information carrying signal are communication data transmitted using guided elastic waves.

28. The method according to claim 27, wherein the communication data is transmitted via the multi-modal dispersive elastic channel, and wherein the dispersive multi-modal elastic channel is a civil structure.

29. The method according to claim 28, further comprising providing a sensor network having a plurality of the at least two sensors capable of both transmitting and receiving a signal, and at least one controller; the plurality of the at least two sensors mounted on the dispersive multi-modal elastic channel.

30. The method according to claim 29, wherein at least one of the steps of the timing acquisition and synchronization method occurs between the at least another sensor capable of both transmitting and receiving a signal and configured and disposed as a source sensor and the sensor network or between the at least one sensor capable of both transmitting and receiving a signal and configured and disposed as a destination sensor and the sensor network or between the sensor network and the at least one controller.

31. The method according to claim 25, wherein the time reversing of the received pilot elastic signal pre-equalizes the dispersive multi-modal elastic channel.

32. The method according to claim 25, wherein one of the normalized time reversed pulse position modulated elastic preamble signal or the normalized time reversed pulse position modulated information carrying signal or both the normalized time reversed pulse position modulated elastic preamble signal and the normalized time reversed pulse position modulated information carrying signal that are transmitted relate to a structural condition of the dispersive multi-modal elastic channel.

33. The method according to claim 25, wherein compensating for signal dispersion at the at least one sensor capable of both transmitting and receiving a signal and configured and disposed as a destination sensor is compensated by transmitting the total waveform via the dispersive multi-modal elastic channel.

* * * * *